(12) United States Patent
Kurozuka

(10) Patent No.: US 8,319,762 B2
(45) Date of Patent: Nov. 27, 2012

(54) SCANNING IMAGE DISPLAY APPARATUS, GOGGLE-SHAPED HEAD-MOUNTED DISPLAY, AND AUTOMOBILE

(75) Inventor: Akira Kurozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 12/667,080

(22) PCT Filed: Apr. 28, 2009

(86) PCT No.: PCT/JP2009/001933
§ 371 (c)(1),
(2), (4) Date: Dec. 29, 2009

(87) PCT Pub. No.: WO2009/133698
PCT Pub. Date: Nov. 5, 2009

(65) Prior Publication Data
US 2011/0012874 A1 Jan. 20, 2011

(30) Foreign Application Priority Data

Apr. 30, 2008 (JP) .................................. 2008-118254

(51) Int. Cl.
*G09G 5/00* (2006.01)
(52) U.S. Cl. ....................................................... 345/204
(58) Field of Classification Search .................. 345/204
See application file for complete search history.

(56) References Cited

U.S. PATENT DOCUMENTS

| | | | | |
|---|---|---|---|---|
| 6,008,781 | A * | 12/1999 | Furness et al. ..................... | 345/8 |
| 6,317,103 | B1 * | 11/2001 | Furness et al. ..................... | 345/8 |
| 6,590,606 | B1 | 7/2003 | Hiller et al. | |
| 2002/0005820 | A1 * | 1/2002 | Son et al. .......................... | 345/8 |

(Continued)

FOREIGN PATENT DOCUMENTS

JP 04-057014 2/1992
(Continued)

OTHER PUBLICATIONS

International Search Report issued Jun. 2, 2009 in International (PCT) Application No. PCT/JP2009/001933.

*Primary Examiner* — Fred Tzeng
(74) *Attorney, Agent, or Firm* — Wenderoth, Lind & Ponack, LLP.

(57) ABSTRACT

A scanning image display apparatus (20) includes a light source (11) and a biaxial scanning mirror (12) two-dimensionally scans a scanning surface (23) with the laser beam. When seen from a side perpendicular to an incident plane (15) including a laser beam incident on the biaxial scanning mirror (12) and a laser beam scanned on the scanning surface (23) by the biaxial scanning mirror (12), with the biaxial scanning mirror (12) held at a rotation center position of the reflection surface, the light source (11) and the biaxial scanning mirror (12) are arranged to have a positional relationship where the laser beam is incident on the reflection surface obliquely at an initial angle of incidence $\alpha_0$ either clockwise or counterclockwise with respect to a first normal line of the reflection surface, and the biaxial scanning mirror (12) and the scanning surface (23) are arranged to have a positional relationship where the laser beam is incident on the scanning surface (23) obliquely at an initial angle of incidence $\beta_0$ the other of clockwise or counterclockwise with respect to a second normal line of the scanning surface (23).

7 Claims, 17 Drawing Sheets

U.S. PATENT DOCUMENTS

| | | | |
|---|---|---|---|
| 2002/0036831 A1* | 3/2002 | Inoguchi et al. | 359/630 |
| 2004/0263968 A1* | 12/2004 | Kobayashi et al. | 359/462 |
| 2008/0001850 A1* | 1/2008 | Champion et al. | 345/7 |
| 2010/0103077 A1* | 4/2010 | Sugiyama et al. | 345/8 |
| 2010/0254019 A1* | 10/2010 | Cui et al. | 359/633 |

FOREIGN PATENT DOCUMENTS

| | | |
|---|---|---|
| JP | 10-301055 | 11/1998 |
| JP | 2000-509522 | 7/2000 |
| JP | 2003-029198 | 1/2003 |
| WO | 97/03380 | 1/1997 |

\* cited by examiner

SCANNING IMAGE DISPLAY APPARATUS, GOGGLE-SHAPED HEAD-MOUNTED DISPLAY, AND AUTOMOBILE

TECHNICAL FIELD

The present invention relates to a scanning image display apparatus such as a head-mounted display (HMD) which performs two-dimensional scanning with a laser beam using a scanning mirror.

BACKGROUND ART

Conventionally, in an image display apparatus such as a head-mounted display (HMD) which is worn on the head of a user and displays images, various methods such as a method using a pixel-type display device including a liquid crystal device and an organic EL as an image display unit, and a method where the image is directly rendered on a retina of an eye by two-dimensional scanning with laser beam have been proposed.

In such an image display apparatus, the entire display apparatus need to be compact and light, in order to reduce the stress for the user upon wearing and to allow long-hour use. Furthermore, designing the image display apparatus similar to conventional eyeglasses allows constant wearing and activities just like when wearing the conventional eyeglasses.

However, the method using the pixel-type display device causes the display unit and ocular optical system using the prism and half mirror which guide the light generated on the display unit to the eye to be larger as the image quality and viewing angle increase, which makes it difficult to make them compact and light.

Furthermore, the ocular optical system covers the eyes, and this makes it difficult to implement a shape of conventional eyeglasses. Accordingly, the imaging apparatus appears more like goggles or helmets rather than eyeglasses. For this reason, the ocular optical system hardly fits naturally.

On the other hand, the retina-scanning display using the laser scanning method achieves an extremely small display device using a compact Micro-Electro-Mechanical System (MEMS) mirror device.

Furthermore, there is a proposal, in which thin optical system is achieved by using a holographic mirror for the ocular optical system instead of the prism and a half mirror, such that the entire apparatus takes a shape of eyeglasses (for example, see Patent Reference 1).

FIGS. 17A, 17B, and 17C show examples of the scanning image display apparatus 100.

FIG. 17A is a plan view, FIG. 17B is a side view, and FIG. 17C is a view from the eyes. Note that, each of the above-mentioned diagrams shows only the left half of the head of the user and the scanning image display apparatus 100. However, when the scanning image display apparatus 100 is applicable to binocular vision, the structure is symmetrical on the left and right (the same applies to the description hereafter).

As shown in FIGS. 17A and 17B, the conventional scanning image display apparatus 100 includes a lens 110 which is arranged in front of the eyes of the user, and a temple 111 an end if which is connected to the outer rim of the lens 110 and the other end of which is fixed on the temporal region of the head of the user.

On the lens 110, the holographic mirror 104 is formed on the side facing the user's eye. On the temple 111, a light source 101 which emits laser beam, a biaxial scanning mirror 102 which two-dimensionally scans the holographic mirror 104 with laser beam, and a control unit 103 which controls each unit are incorporated.

The laser beam emitted from the light source 101 is projected on the lens 110 using the biaxial scanning mirror 102, reflects on the holographic mirror 104 formed on the lens 110, enters the eye 120 of the user, and forms an image on the retina. The holographic mirror 104 is, for example, a photopolymer layer on which Lippmann volume hologram is formed, and reflects only the wavelength of the laser beam by giving wavelength selectivity. As a result, the user can view both the outside scenery and images rendered by the laser beam at the same time.

In the scanning image display apparatus 100 with the structure described above, the optical axis of emitting the laser beam from the ear 121 side of the temple 111 (posterior to the biaxial scanning mirror when seen by the user) to an MEMS mirror and the central axis of the eye 120 are substantially parallel, when the MEMS mirror is used for the biaxial scanning mirror 102. Furthermore, the angle of incidence $\alpha$ (the angle formed with the normal line of the reflection surface and the axis of incident light) of the laser beam on the MEMS mirror is equal to the angle of incidence $\beta$ from the biaxial scanning mirror 102 to the holographic mirror 104. More specifically, when the arrangement is made such that the laser beam from the MEMS mirror is projected on the holographic mirror 104 without being interrupted with the face of the user, $\alpha=\beta=$approximately 60 degrees is satisfied.

In addition, there is an example where the structure is the same as the structure shown in FIGS. 17A and 17B, but the incident direction of the laser beam is different (for example, see Patent Reference 2).

CITATION LIST

Patent Literature
[Patent Literature 1]
Japanese Unexamined Patent Application Publication No. 10-301055
[Patent Literature 2]
Japanese Unexamined Patent Application Publication No. 2003-029198

SUMMARY OF INVENTION

Technical Problem

However, in the conventional goggle-shaped HMD, there is a problem that the image projected on the holographic mirror is distorted into a trapezoid shape.

As shown in FIG. 17C, the laser beam from the biaxial scanning mirror 102 is obliquely projected on the holographic mirror 104. Generally, when a rectangle video is obliquely projected on the projection plane, the farther the scanning beam is from the scanning center, the wider the projected scanning beam becomes. This results in a trapezoid-shaped projection area which is narrower on the side closer to the biaxial scanning mirror 102, and wider on the side farther to the biaxial scanning mirror 102. Accordingly, the image reflected on the holographic mirror 104 entering the eye 105, reaching the retina, and recognized by the user is also distorted into a trapezoid shape.

Normally, front projectors and others perform image processing to correct the keystone distortion. This means, a rectangle image can be displayed in front of the user by determining a rectangle display area through adjusting the lengths to a shorter length among the upper base or lower base of the trapezoid, and by not displaying the part of image sticking out of the rectangle area (hereinafter referred to as an invalid scanning area).

However, with this method, the image is reduced upon display on the side where the projection area widens, and thus the resolution that can be displayed decreases. Furthermore, the larger the invalid scanning area is, the shorter the time for displaying an image of a frame becomes. This darkens the image. It is necessary to increase optical output of the light source in order to maintain the brightness, although this increases the consumption electricity.

Furthermore, correction of the keystone distortion caused by oblique projection with respect to the lens 110 through image display is disclosed in both of the conventional examples; however, neither of the conventional examples defines a positional relationship between the biaxial scanning mirror 102 and a holographic mirror 104 which is a projection surface.

The present invention is conceived in order to solve the problem, and it is an object of the present invention to arrange the scanning mirror and the projection surface appropriately, to remove or reduce the keystone distortion on the projection area to reduce the invalid scanning area, and to provide a scanning-type image display apparatus which achieves good display.

Solution to Problem

A scanning image display apparatus according to the present invention includes: a light source which emits a laser beam; and a scanning unit configured to two-dimensionally scan a scanning surface with the laser beam by two-dimensionally rotating a reflection surface which reflects the laser beam emitted by the light source. Furthermore, when seen from a side which is perpendicular to an incident plane including a laser beam incident on the scanning unit and a laser beam scanned on the scanning surface by the scanning unit, with the scanning unit held at a rotation center position of the reflection surface, the light source and the scanning unit are arranged to have a positional relationship where the laser beam emitted by the light source is incident on the reflection surface, the laser beam being incident on the reflection surface obliquely at an initial angle of incidence $\alpha_0$ either clockwise or counterclockwise with respect to a first normal line of the reflection surface at an incident position of the laser beam. In addition, the scanning unit and the scanning surface are arranged to have a positional relationship where the laser beam scanned by the scanning unit is incident on the scanning surface, the laser beam being incident on the scanning surface obliquely at an initial angle of incidence $\beta_0$ the other of clockwise or counterclockwise with respect to a second normal line of the scanning surface at an incident position of the laser beam.

With the structure described above, the keystone distortion caused by the oblique entrance of the laser beam on the scanning surface and the keystone distortion caused by the oblique entrance of the laser beam cancel each other. As a result, it is possible to shape the scanning trace projected on the scanning surface closer to a rectangle.

Further, the scanning unit two-dimensionally scans the scanning surface with the laser beam emitted by the light source by rotating a first rotation axis which is perpendicular to the incident plane by an angular amplitude $\pm\theta y$ and by rotating a second rotation axis which is perpendicular to both the first normal line and the first rotation axis by an angular amplitude $\pm\theta x$. Furthermore, a perpendicular scanning angle $\omega(\alpha)$ which is an angle that the laser beam scanned by the scanning unit rotating the second rotation axis by $+\theta x$ makes with the laser beam scanned by the scanning unit rotating the second rotation axis by $-\theta x$ may satisfy Equation 1 as a function of an actual angle of incidence $\alpha$ (($\alpha_0-\theta y$)$\leqq\alpha\leqq(\alpha_0+\theta y)$) on the scanning unit.

Determining the initial angles of incidence $\alpha_0$ and $\beta_0$, and the angular amplitudes $\theta x$ and $\theta y$ allows reducing the invalid area into half or less, and suppressing the trapezoid ration at 1.5 or less.

Furthermore, the perpendicular scanning angle $\omega(\alpha)$ may further satisfy Equation 2. This allows minimizing the invalid scanning area.

Furthermore, the scanning unit may be arranged to have the first and second rotation axes being rotated at a predetermined angle in a predetermined rotation direction with respect to the first normal line, when the scanning surface is arranged to cross the incident plane at an acute angle. More specifically, the rotation direction may be a direction for moving, closer to the incident plane, a farthest entering position from the scanning unit among the entering positions of the laser beam scanned by the scanning unit on the scanning surface. This further reduces the invalid area The goggle-shaped head mounted-display according to the present invention includes: a lens arranged in front of an eye of a user; a temple, an end of which is connected to the lens and the other end of which is fixed on a temporal part of a head of the user; and the scanning image display apparatus. Further, the light source and the scanning unit are held on the temple. The scanning surface is arranged on a side of the lens facing the eye of the user and deflects the laser beam scanned by the scanning unit to a direction toward the eye of the user.

Further, the temple further holds a reflector for changing a direction of the laser beam emitted by the light source to cause the laser beam to be incident on the scanning unit. Furthermore, the light source, the reflector, and the scanning unit may be arranged to have a positional relationship such that a laser beam moving from the light source to the reflector moves from back to front when seen by the user, and a laser beam moving from the reflector to the scanning unit moves from front to back when seen by the user.

The automobile according to the present invention includes: a seat; a dashboard arranged in front of the seat; a windshield arranged above the dashboard; and the scanning image display apparatus. The light source and the scanning unit are held in the dashboard. Further, the scanning surface is arranged on the windshield in a position facing the seat, and deflects the laser beam scanned by the scanning unit to a direction toward the eye of the user sitting in the seat.

Advantageous Effects of Invention

The keystone distortion can be removed or decrease by appropriately arranging the scanning unit and the scanning surface, even when the arrangement is made such that the laser beam obliquely enters the scanning surface. As a result, it is possible to reduce the invalid scanning area, to achieve good display, and to implement a smaller scanning image display apparatus requiring lower consumption electricity.

FURTHER INFORMATION ABOUT TECHNICAL BACKGROUND TO THIS APPLICATION

The disclosure of Japanese Patent Application No. 2008-118254 filed on Apr. 30, 2008 including specification, drawings and claims is incorporated herein by reference in its entirety.

DESCRIPTION OF EMBODIMENTS

Figure 1:
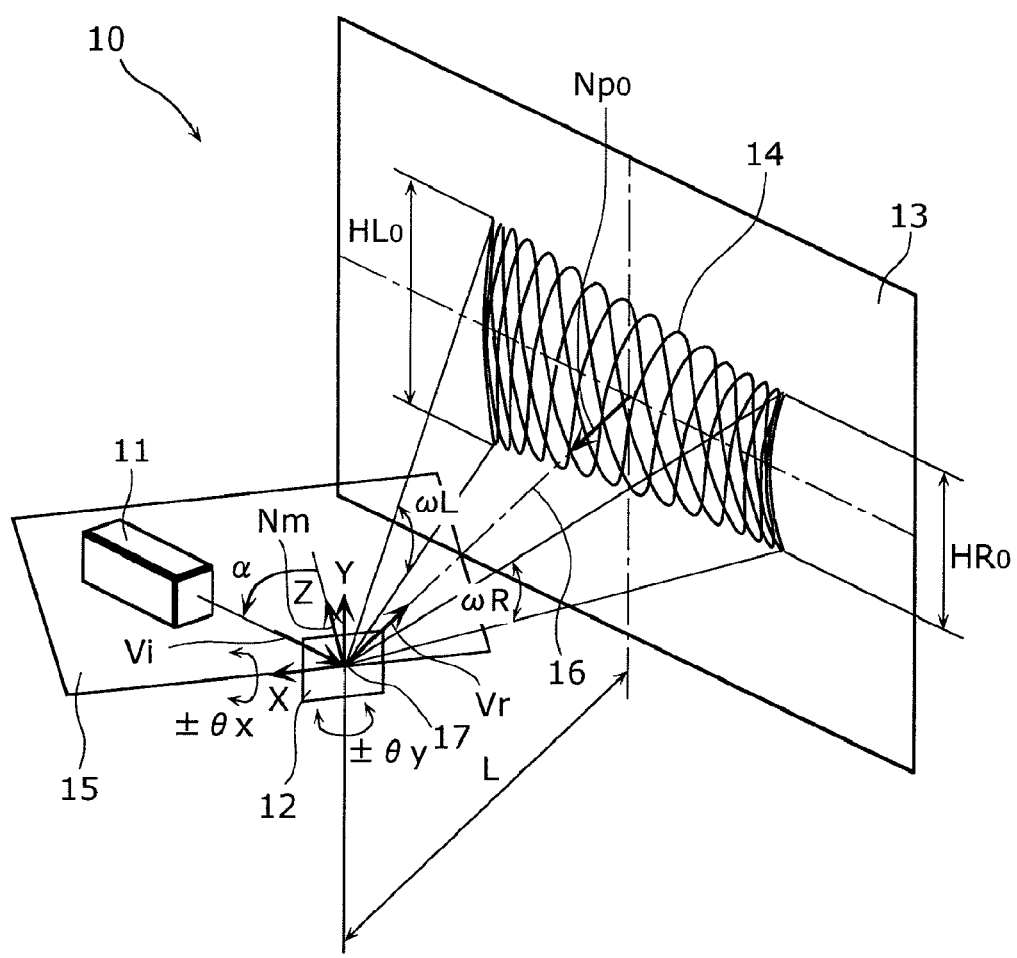
FIG. 1 is a model diagram showing a scanning image display apparatus when the laser beam is incident on the scanning surface at an initial angle of incidence $\beta_0=0°$.

FIG. 1 is a model diagram for describing the premise of the present invention. First, the components of a scanning image display apparatus 10 which is the premise of the present invention, the positional relationship of the components thereof, and the operations of the components are described with reference to FIG. 1.

The scanning image display apparatus 10 shown in FIG. 1 includes a light source 11, a biaxial scanning mirror 12 as a scanning unit, and a scanning surface 13. The light source 11 emits laser beam to the biaxial scanning mirror 12. The biaxial scanning mirror 12 two-dimensionally scans the scanning surface 13 with the laser beam emitted by the light source 11.

In FIG. 1, the rotating center of the biaxial scanning mirror 12 is determined as the originating point, and an X axis, a Y axis, and a Z axis are respectively arranged in the horizontal direction, the upper perpendicular direction, and the normal line direction as a coordinate system (due to the arrangement, the biaxial scanning mirror 12 is seen from the back side (the side opposite to the reflection surface) in FIG. 1.

The biaxial scanning mirror 12 is an MEMS mirror having a reflection surface reflecting the laser beam emitted from the light source 11. The biaxial scanning mirror 12 rotates the X axis by the angle amplitude $\pm\theta x$ and the Y axis by the angle amplitude $\pm\theta y$ to two-dimensionally scan the scanning surface 13 with the laser beam. The laser beam scanned two-dimensionally by the biaxial scanning mirror 12 subsequently draws the scanning trace 14 on the scanning surface 13.

Note that, the center of the scanning area of the biaxial scanning mirror 12 is defined as "a scanning center position (also referred to as "a rotating center position") of the reflection surface). More specifically, the position (the direction) when the angular amplitude around the X axis is 0°, and when the angular amplitude around the Y axis is 0°, the position (direction) of the biaxial scanning mirror 12 is defined as the scanning center position. Here, the normal vector Nm of the biaxial scanning mirror 12 matches the Z axis. The trace of the laser beam from the biaxial scanning mirror 12 in the scanning center position to the scanning surface 13 is defined as "a scanning center axis 16", and an intersection point of the biaxial mirror 12 and the scanning center axis 16 is defined as "a scanning center point 17".

Furthermore, when the biaxial scanning mirror 12 is in the scanning center position, the initial angle of incidence of the laser beam emitted from the light source 11 to the biaxial scanning mirror 12 is referred to as $\alpha_0$, and the initial angle of incidence of the laser beam scanned by the biaxial scanning mirror 12 on the scanning surface 13 is referred to as $\beta_0$ (not shown in FIG. 1). Note that, the angle of incidence on each plane is represented as an angle between the normal line of the plane and the trace of the laser beam.

As shown in FIG. 1, when the biaxial scanning mirror 12 is in the scanning center position, the initial angle of incidence $\alpha_0$ to the biaxial scanning mirror 12 is taken from the normal vector Nm of the biaxial scanning mirror 12 in the X axis direction. More specifically, the light source 11 and the biaxial scanning mirror 12 are arranged such that the incident plane 15 which includes the incident beam victor Vi indicating the direction of the laser beam and the normal vector Nm matches the XZ plane.

In general, the laser beam reflected on a planar mirror such as the biaxial scanning mirror 12 passes through the incident plane 15. Furthermore, the angle of reflection (the angle which the normal vector Nm of the biaxial scanning mirror 12 makes with the reflection beam) is equal to the angle of incidence. Accordingly, the reflected beam vector Vr reflected on the biaxial scanning mirror 12 is on the incident plane 15, and matches the scanning center axis 16.

Here, when the biaxial scanning mirror 12 rotates the Y axis by the angular amplitude $\pm\theta y$, the normal vector Nm moves on the XZ plane. Thus, the incident plane matches the XZ plane and does not move, and the actual angles of incidence $\alpha$, and the angles of reflection both change from ($\alpha_0-\theta y$) to ($\alpha_0+\theta y$). Accordingly, the reflected beam vector Vr moves on the incident plane 15 matching the XZ plane. Here, the reflection beam vector Vr moves with respect to the scanning center axis 16 by $\pm 2\theta y$ in the horizontal direction. More specifically, the horizontal scanning angle of the biaxial scanning mirror 12 is $4\theta y$.

Note that, in the model shown in FIG. 1, the scanning surface 13 is arranged to be perpendicular to ($\beta_0=0°$) the scanning center axis 16. More specifically, the normal vector $Np_0$ of the scanning surface 13 and the scanning center axis 16 match each other. With this, the optical path length of the laser beam from the biaxial scanning mirror 12 to the scanning surface 13 in the horizontal direction corresponds to the scanning center axis 16. As a result, no keystone distortion caused by the obliquely projected laser beam with respect to the scanning surface 13 is generated in this model.

On the other hand, when the biaxial scanning mirror 12 rotates the X axis by the angular amplitude $\pm\theta x$, the normal vector Nm rotates in the perpendicular direction. As a result, the incident plane 15 and the reflected beam vector Vr tilts such that the reflected beam vector crosses the XZ plane.

Here, in the model shown in FIG. 1, the initial angle of incidence on the biaxial scanning mirror 12 is $\alpha_0\neq 0°$. Thus, the vertical scanning angle of the biaxial scanning mirror 12 is not a constant value ($4\theta x$) as the horizontal scanning angle, but changes depending on the actual angle of incidence $\alpha$. More specifically, the larger the angle of incidence $\alpha$ becomes, the smaller the vertical scanning angle becomes. In addition, the smaller the angle of incidence $\alpha$ becomes, the larger the vertical scanning angle becomes. More specifically, as shown in FIG. 1, the vertical width of the scanning trace 14 on the scanning surface 13 is small on the right side of the scanning surface 13, and large on the left side of the scanning surface 13 ($HL_0 > HR_0$).

This is shown as follows using a reflection equation of the vector.

The originating point is set at the center of the biaxial scanning mirror 12 (the scanning center point 17), the X axis is set in the horizontal direction, the Y axis is set in the vertical direction, and the Z axis is set in the normal line direction of the biaxial scanning mirror 12. With respect to the normal vector $Nm0=(0, 0, 1)$ of the biaxial scanning mirror 12 at the scanning center position, the incident beam vector Vi at the initial angle of incidence $\alpha_0$ can be represented as the equation 3, using the rotation matrix Ry around the Y axis.

[Math. 1]

$$Vi = -Nm_0 \bullet Ry(\alpha_0) = \qquad \text{(Equation 3)}$$

$$-(0, 0, 1)\begin{bmatrix} \cos\alpha_0 & 0 & -\sin\alpha_0 \\ 0 & 1 & 0 \\ \sin\alpha_0 & 0 & \cos\alpha_0 \end{bmatrix} = (-\sin\alpha_0, 0, -\cos\alpha_0)$$

Furthermore, when the biaxial scanning mirror 12 rotates the X axis by the angular amplitude $\pm\theta x$, the normal vector Nm can be represented as Equation 4, using the rotation matrix Rx around the X axis.

[Math. 2]

$$Nm = Nm_0 \bullet Rx(\theta x) = \qquad \text{(Equation 4)}$$

$$(0, 0, 1)\begin{bmatrix} 1 & 0 & 0 \\ 0 & \cos(\theta x) & \sin(\theta x) \\ 0 & -\sin(\theta x) & \cos(\theta x) \end{bmatrix} = (0, -\sin(\theta x), \cos(\theta x)).$$

Furthermore, the reflected beam vector Vr ($\theta x$) when the biaxial scanning mirror 12 rotates by the angular amplitude $\theta x$ can be represented as Equation 5, using Equation 3 and Equation 4.

[Math. 3]

$$Vr(\theta x) = Vi - 2(Nm \cdot Vi)Nm = (-\sin\alpha_0, -2\cos\alpha_0\cos(\theta x) \\ \sin(\theta x), -\cos\alpha_0 + 2\cos^2(\theta x)\cos\alpha_0). \qquad \text{(Equation 5)}$$

Similarly, the reflected beam vector Vr ($-\theta x$) when the biaxial scanning mirror 12 rotates by the angular amplitude $-\theta x$ can be represented as Equation 6.

[Math. 4]

$$Vr(-\theta x) = (-\sin\alpha_0, 2\cos\alpha_0\cos(\theta x)\sin(\theta x), -\cos\alpha_0 + 2 \\ \cos^2(\theta x)\cos\alpha_0) \qquad \text{(Equation 6)}$$

Therefore, the vertical scanning angle $\omega$ which Vr ($\theta x$) makes with Vr ($-\theta x$), can be represented as shown in Equation 7, using Equation 5 and Equation 6.

[Math. 5]

$$\cos\omega(\alpha) = Vr(\theta x) \cdot Vr(-\theta x) = 1 - 4\cos^2(\theta x)\cos^2\alpha_0(\sin^2 \\ (\theta x) - \cos^2\alpha_0 + 1) \qquad \text{(Equation 7)}$$

Figure 2:
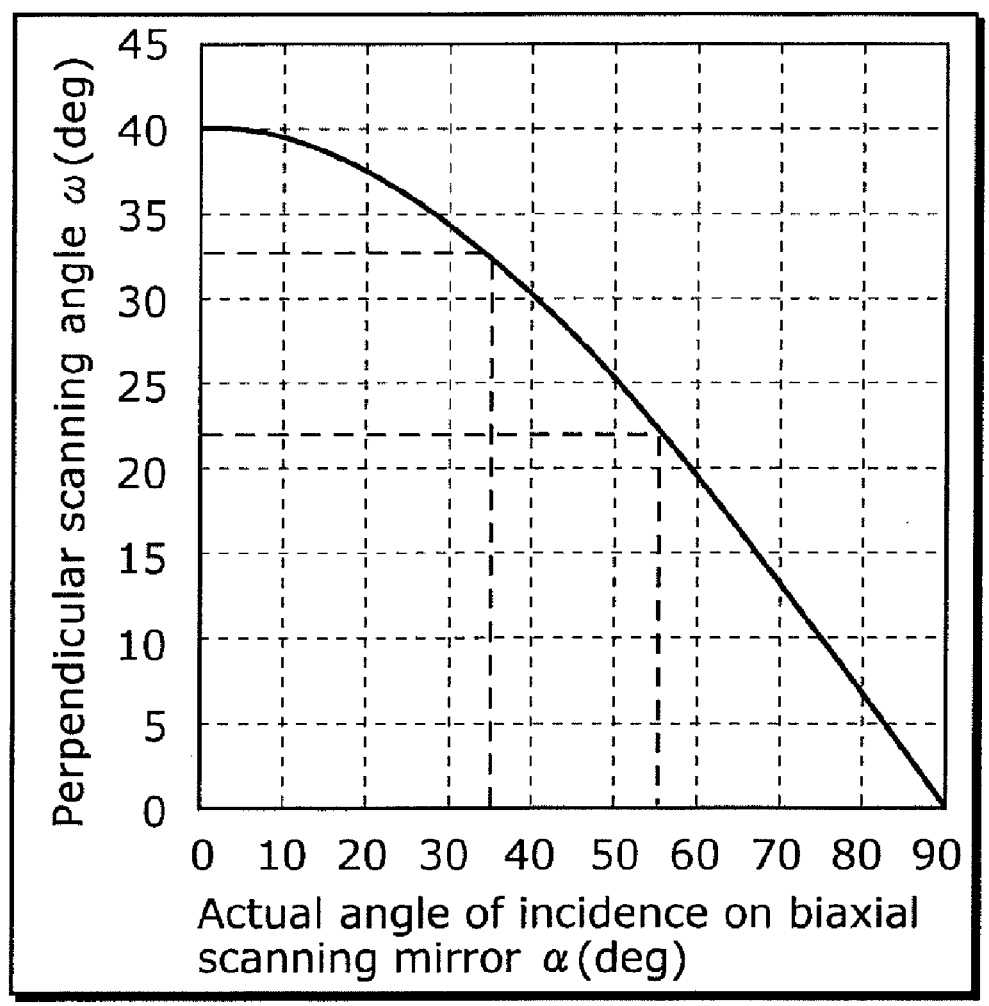
FIG. 2 is a diagram showing the relationship between the actual angle of incidence $\alpha$ on the biaxial scanning mirror and the vertical scanning angle $\omega$.

For example, the relationship of the actual angle of incidence $\alpha$ and the vertical scanning angle $\omega$ when $\theta x=\pm 10°$ is shown in FIG. 2.

As shown in FIG. 2, when the angle of incidence $\alpha=0°$, the vertical scanning angle $\omega$ is $4\theta x=40°$. Furthermore, FIG. 2 also shows that the vertical scanning angle $\omega$ decreases as the angle of incidence $\alpha$ increases (the reflected beam vector Vr moves towards the right side on the scanning surface 13 in FIG. 1). Accordingly, when the initial angle of incidence $\alpha_0=45°$, and the biaxial scanning mirror 12 rotates the Y axis by $\theta y=\pm 10°$, the actual angle of incidence $\alpha$ changes from 35° to 55°.

Similarly, the value of the vertical scanning angle $\omega(\alpha)$ represented as a function of the actual angle of incidence $\alpha$ changes from $\omega(35°)=\omega L=32.5°$ to $\omega(55°)=\omega R=22.6°$. More specifically, the heights of the scanning trace 14 rendered by the scanning beam changes on the left and right. This is the reason why the height on the left end $HL_0$ and the height on the right end $HR_0$ of the scanning trace 14 projected on the scanning surface 13 are different.

Here, suppose the distance from the biaxial scanning mirror 12 to the scanning surface 13 on the scanning center axis 16 is determined as L. The height on the left end $HL_0$ and the height on the right end $HR_0$ can be represented as shown in Equation 8 and Equation 9.

[Math. 6]
$$HL_0 = \frac{\pi \times \omega L}{180} \times \frac{L}{\cos 2\theta y} \quad \text{(Equation 8)}$$

[Math. 7]
$$HR_0 = \frac{\pi \times \omega R}{180} \times \frac{L}{\cos 2\theta y} \quad \text{(Equation 9)}$$

Figure 3:
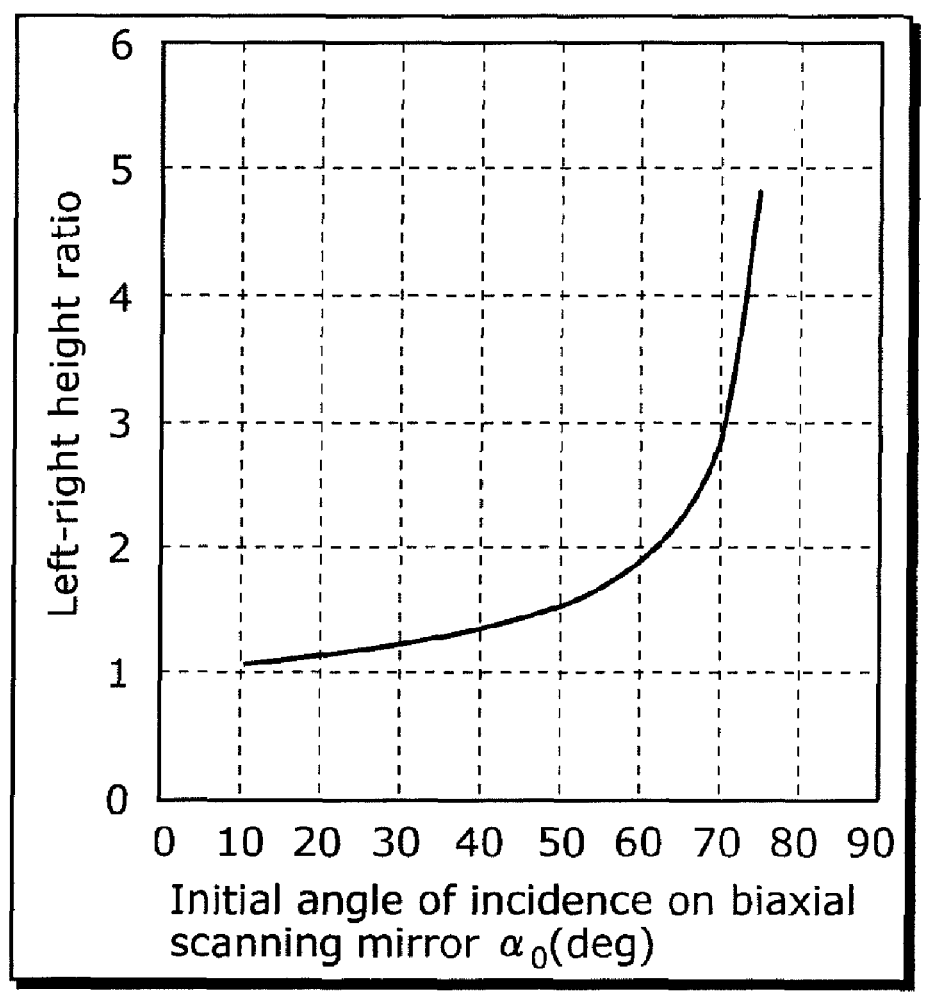
FIG. 3 is a diagram showing the relationship between the initial angle of incidence $\alpha_0$ on the biaxial scanning mirror and the left-right height ratio of the scanning trace.

FIG. 3 shows the relationship between the initial angle of incidence $\alpha_0$ of the biaxial scanning mirror 12 which rotates by $\theta x = \theta y = \pm 10°$ and the left-right height ratio of the scanning trace 14 ($HL_0/HR_0$). As shown in FIG. 3, the larger the initial angle of incidence $\alpha_0$, the larger the left-right height ratio of the scanning traces 14.

As described above, in the scanning image display apparatus 10 which two-dimensionally scans the scanning surface 13 with the laser beam by shaking the biaxial scanning mirror 12 in the biaxial direction, setting the initial angle of incidence on the biaxial scanning mirror $\alpha \neq 0°$ results in the scanning trace 14 on the scanning surface 13 to be distorted into a trapezoid shape, even if the initial angle of incidence on the scanning surface 13 is $\beta = 0°$.

Accordingly, the embodiments 1 to 4 in the present invention describe structures for shaping the scanning trace 14 on the scanning surface 13 to have a rectangular shape by cancelling the keystone distortion caused by obliquely projecting the laser beam on the scanning surface 13 ($\beta_0 \neq 0°$) and the keystone distortion caused by setting the initial angle of incidence $\alpha \neq 0°$ on the biaxial scanning mirror 12.

Embodiment 1

Figure 4:
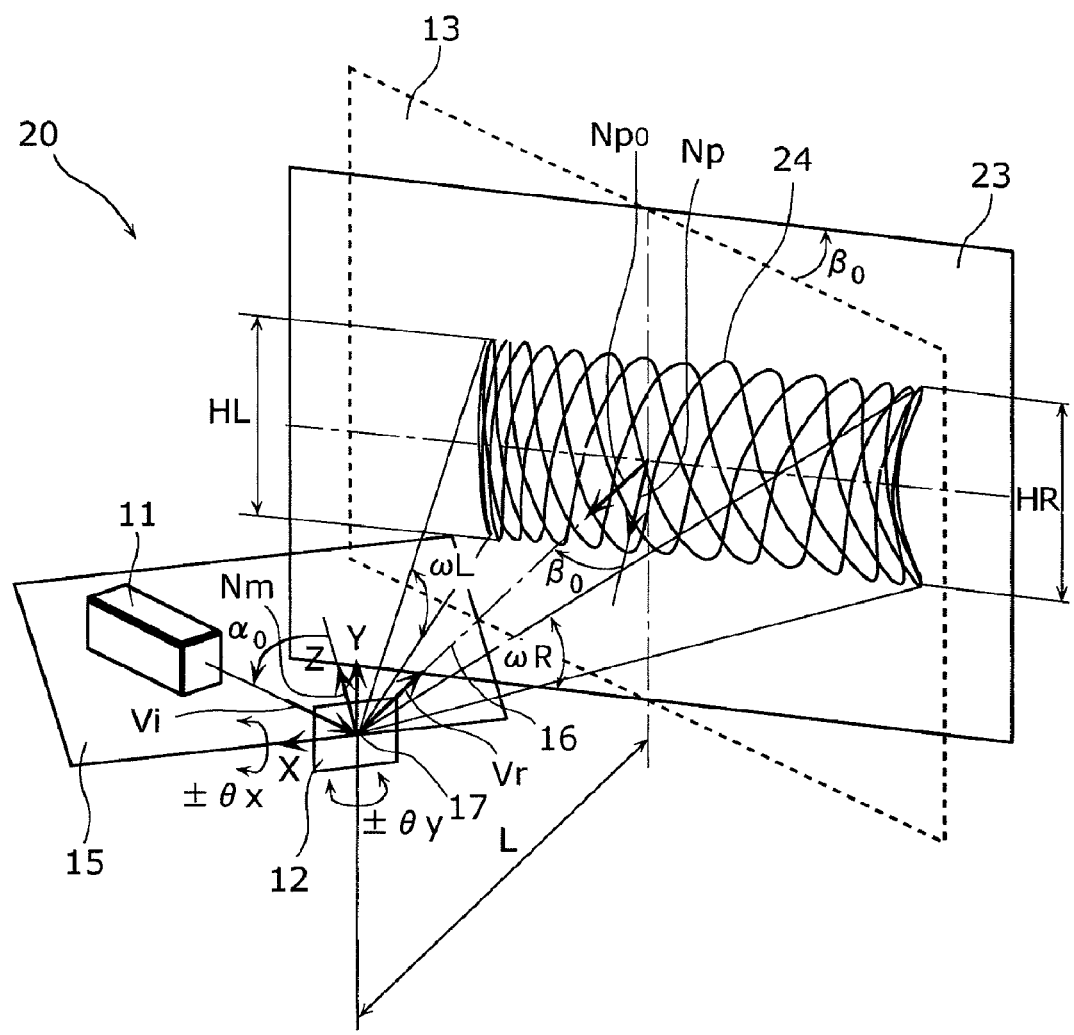
FIG. 4 is a model diagram showing a scanning image display apparatus according to the embodiment 1 of the present invention.
Figure 5:
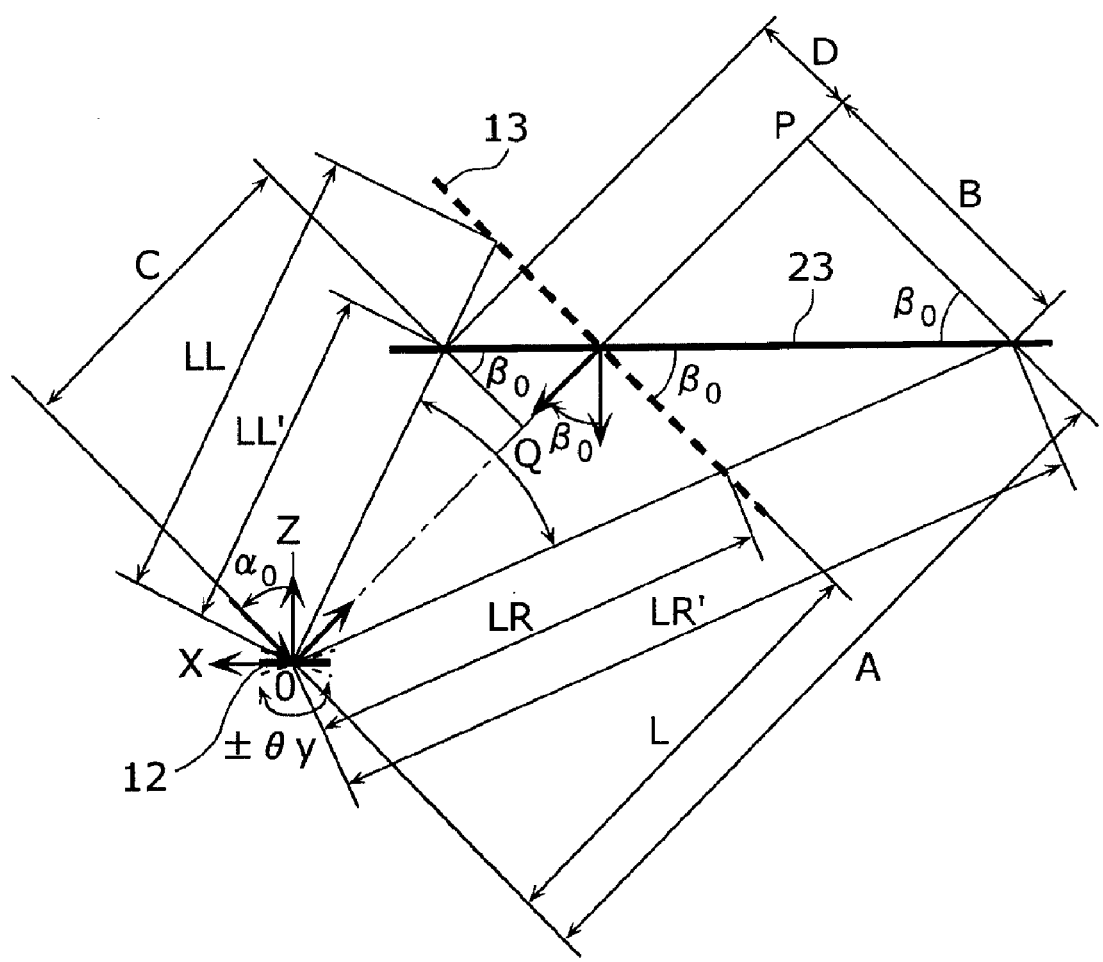
FIG. 5 is a diagram of FIGS. 1 and 4 seen from a side perpendicular to the incident plane.

The following is a description for the scanning image display apparatus 20 according to the embodiment 1 of the present invention with reference to FIGS. 4 and 5. FIG. 4 is a schematic diagram of the scanning image display apparatus 20. FIG. 5 is a plan view of the scanning image display apparatuses 10 and 20 seen from above. Note that, the description hereafter focuses on the difference with the FIG. 1. The same reference numerals are attached to the components identical to those shown in FIG. 1, and the detailed description for these components is omitted.

The scanning image display apparatus 20 shown in FIG. 4 is different from the scanning image display apparatus 10 shown in FIG. 1 in that the scanning surface 23 is not perpendicular to the scanning center axis 16. More specifically, the scanning surface 23 rotates the vertical axis counterclockwise by an angle $\beta_0$ with respect to the scanning surface 13 perpendicular to the scanning center axis 16. More specifically, the scanning surface 23 is arranged such that the initial angle of incidence of the laser beam is $\beta_0 \neq 0°$. In other words, the angle that the normal vector Np of the scanning surface 23 makes with the scanning center axis 16 matches $\beta_0$.

Next, the positional relationship of the each component in the scanning image display apparatuses 10 and 20 are described in detail with reference to FIG. 5.

First, in the scanning image display apparatus 10, when the distance from the scanning center point 17 to the left end of the scanning trace 14 on the scanning surface 13 (that is, the "optical path length". The same term shall be used hereafter) is determined as LL, and the distance to the right end of the scanning trace 14 is determined as LR, LL=LR is satisfied. On the other hand, in the scanning image display apparatus 20, the distance from the scanning center point 17 to the left end of the scanning trace 24 on the scanning surface 23 is determined as LL', and the distance to the right end of the scanning trace 24 is determined as LR', LL'<LL and LR'>LR are satisfied. More specifically, on the scanning surface 23 of the scanning image display apparatus 10 according to the embodiment 1, the keystone distortion caused by the obliquely incident laser beam is generated.

Here, the intersection between the perpendicular extending from the right end of the scanning trace 24 to the scanning center axis 16 and the scanning center axis 16 is determined as the point P, the distance from the scanning center point 17 to the point P is determined as A, and the distance from the right end of the scanning trace 24 to the point P is determined as B. They satisfy $B/A = \tan^2 \theta y$, $(A-L)/B = \tan \beta$. Accordingly, LR/LR' can be represented as Equation 10.

[Math. 8]
$$\frac{L}{A} = 1 - \tan 2\theta y \tan \beta_0 = \frac{LR}{LR'} \quad \text{(Equation 10)}$$

Similarly, the intersection of the perpendicular extending from the left end of the scanning trace 24 to the scanning center axis 16 and the scanning center axis 16 is determined as the point Q, the distance from the scanning center point 17 to the point Q is determined as C, and the distance from the left end of the scanning trace 24 to the point Q is determined as D. This satisfies $D/C = \tan^2 \theta y$, $(L-C)/D = \tan \beta$. Accordingly, LL/LL' can be represented as shown in Equation 11.

[Math. 9]
$$\frac{L}{C} = 1 + \tan 2\theta y \tan \beta_0 = \frac{LL}{LL'} \quad \text{(Equation 11)}$$

Furthermore, LR=LL. Accordingly, the ratio LR'/LL' of the heights on the left end and right end of the scanning trace 24 on the scanning surface 23 can be represented as shown in Equation 12, using Equation 10 and Equation 11.

[Math. 10]
$$\frac{LR'}{LL'} = \frac{1 + \tan 2\theta y \tan \beta_0}{1 - \tan 2\theta y \tan \beta_0} \quad \text{(Equation 12)}$$

The above description shows the following.

More specifically, the scanning trace 24 of the laser beam two-dimensionally scanned by the biaxial scanning mirror 12, when the initial angle of incidence $\alpha$ of the biaxial scanning mirror 12 is set on the horizontal plane, the heights on the left and right change depending on the actual angle of incidence $\alpha$.

Furthermore, when the laser beam is obliquely incident on the scanning surface 23 ($\beta_0 \neq 0°$), the heights on the left and right change depending on the angle of incidence $\beta$. Therefore, setting the angle of incidence $\alpha$ on the biaxial scanning mirror 12 and the angle of incidence β on the scanning surface 23 appropriately even out the heights on the left and right, or reduces the left-right height ratio of the scanning pattern. In other words, the height ratio increases depending on the arrangement.

More specifically, each component may be arranged such that the left-right height ratio ($HL_0/HR_0$) which is a result of the two-dimensional scanning using the biaxial scanning mirror 12 at the initial angle of incidence $α_0$ and the left-right optical path length ratio (LL'/LR') which is a result of the scanning on the scanning surface 23 with the laser beam at an initial angle of incidence $β_0$ cancel each other, that is, ($HL_0$/$HR_0$)×(LL'/LR')=1 is satisfied.

For this purpose, the initial angles of incidence $α_0$ and $β_0$ are set with respect to the vertical scanning angle ω that satisfies Equation 7 above, such that the relationship described in Equation 2 is satisfied, using Equations 8, 9, and 12. With this, the left-right height ratio of the scanning trace 24 is 1.

[Math. 11]

$$\frac{\omega(\alpha_0 - \theta y)}{\omega(\alpha_0 + \theta y)} = \frac{1 + \tan 2\theta y \tan \beta_0}{1 - \tan 2\theta y \tan \beta_0} \quad \text{(Equation 2)}$$

Figure 6:
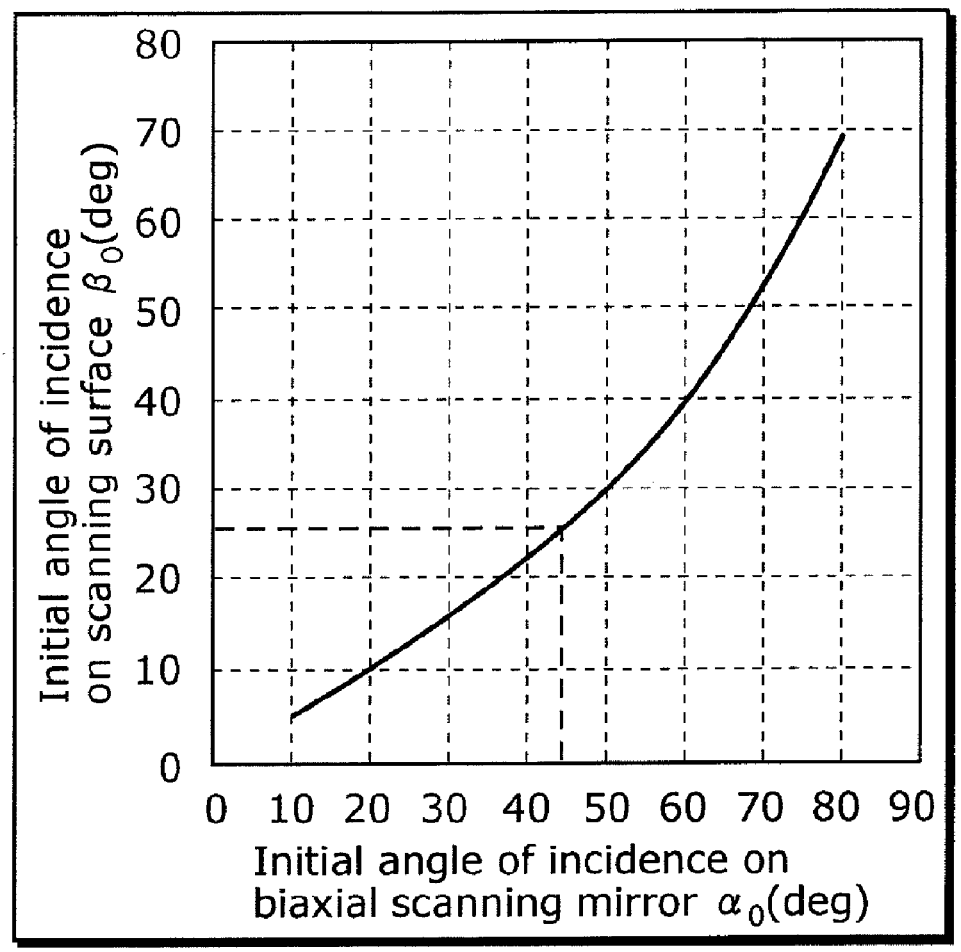
FIG. 6 shows a relationship between the initial angle of incidence $\alpha_0$ on the biaxial scanning mirror and the initial angle of incidence $\beta_0$ on the scanning surface, when a trapezoid ratio of the scanning trace is 1.

FIG. 6 shows the relationship of the initial angles of incidence $α_0$ and $β_0$ that satisfies Equation 2 above in the case where the angular amplitude of the biaxial scanning mirror 12 is θx=θy=±10°.

As described in FIG. 5 above, the initial angle of incidence $α_0$ is taken counterclockwise from the normal vector Nm on the biaxial scanning mirror 12, and the initial angle of incidence $β_0$ is taken clockwise from the normal vector Np of the scanning surface 23, such that the left-right height ratio when the initial angle of incidence of the biaxial scanning mirror 12 is $α_0$ and the left-right ratio when the initial angle of incidence of the scanning surface 23 is $β_0$ cancel each other.

In this case, due to the effect caused by the actual angle of incidence α on the biaxial scanning mirror 12, the height of the scanning trace 24 is lower on the right side where the angle of incidence α is larger, and the height of the scanning trace 24 is higher on the left side where the angle of incidence α is smaller. At the same time, due to the effect caused by the actual angle of incidence β on the scanning surface 23, the height is higher on the right side where the angle of incidence β is larger and lower on the left side where the angle of incidence β is smaller. Accordingly, as they cancel each other, the shape of the scanning trace 24 becomes closer to a rectangle.

Note that the structure to achieve the effect of the present invention is not limited to the abovementioned description. More specifically, the initial angles of incidence $α_0$ and $β_0$ may be set in the opposite directions with respect to the normal vectors Nm, Np, respectively. More specifically, one of the initial angles of incidence $α_0$ or $β_0$ is set clockwise with respect to the corresponding normal vector Nm or Np, and the other of the initial angles of incidence $α_0$ or $β_0$ may be set counterclockwise. On the other hand, when the initial angles of incidence $α_0$ and $β_0$ are respectively measured in the same direction with respect to the normal vectors Nm and Np, the keystone distortion further increases due to the multiplier effect of the both angles.

For example, as evident from FIG. 6, when the initial angle of incidence $α_0$=45°, Equation 2 is satisfied when the initial angle of incidence $β_0$=26°.

FIGS. 7A to 7D show the scanning traces 14, 24, 24A, and 24B when the initial angle of incidence on the biaxial scanning mirror 12 is fixed at $α_0$=45°, the angular amplitude of the biaxial scanning mirror 12 is fixed at θx=θy=±10° and the initial angle of incidence $β_0$ on the scanning surface 23 changes. Here, the scanning is the Lissajous scanning which is a vertically high-speed scanning where the vertical scanning frequency is higher than the horizontal scanning frequency. However, the shape of the scanning traces 14, 24, 24A and 24B are identical regardless of the scanning frequency being at high speed.

Figure 7A:
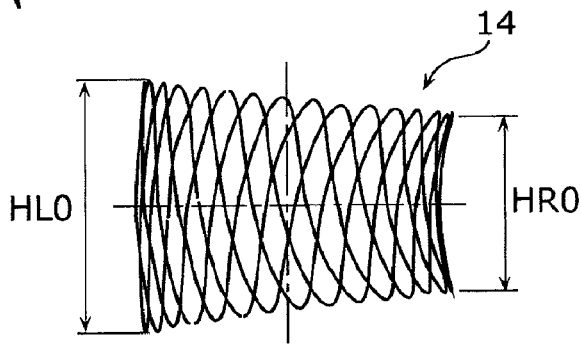
FIG. 7A is a diagram showing a scanning trace when the initial angles of incidence $\alpha_0=45°$, and $\beta_0=0°$.

FIG. 7A is a figure showing the initial angle of incidence $β_0$=0°, that is, the scanning trace 14 on the scanning surface 13 perpendicular to the scanning center axis 16. As shown in FIG. 7A, the heights on the left and right of the scanning trace 14 is represented as $HL_0$>$HR_0$.

Figure 7B:
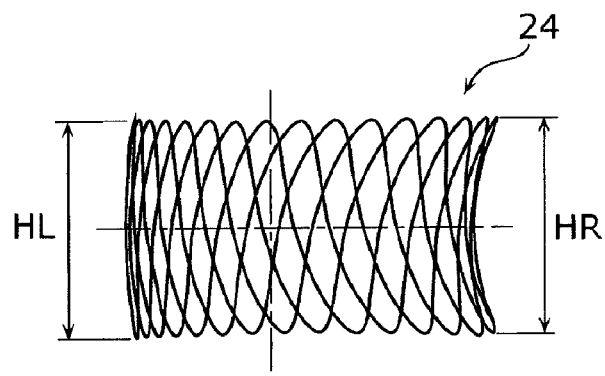
FIG. 7B is a diagram showing a scanning trace when the initial angles of incidence $\alpha_0=45°$, and $\beta_0=-26°$.

FIG. 7B is a figure showing the scanning trace 24 when the initial angle of incidence $β_0$=−26° (the negative sign is assigned since it is in a direction opposite to the direction of the initial angle of incidence $α_0$). The combination of the initial angles of incidence $α_0$ and $β_0$ satisfies Equation 2. That is, the heights on the left and right of the scanning trace 24 is HL=HR. Having the same height on the left and the right minimizes the invalid scanning area when displaying the image. Note that, the "invalid scanning area" indicates an area in the scanning trace 24 where the image is not actually displayed.

Figure 7C:
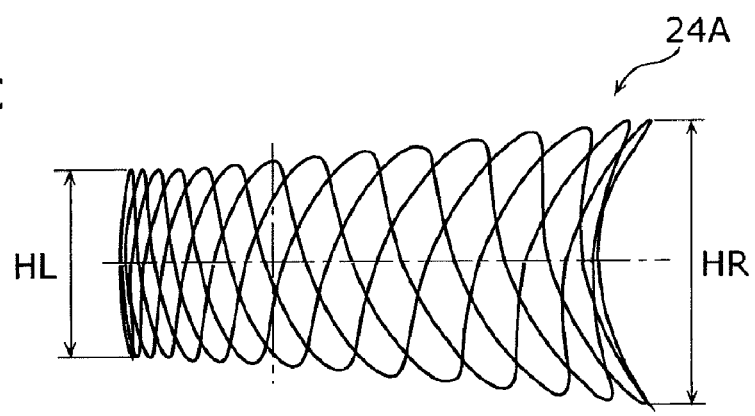
FIG. 7C is a diagram showing a scanning trace when the initial angles of incidence $\alpha_0=45°$, and $\beta_0=-45°$.

FIG. 7C is a figure showing the scanning trace 24A when the initial angle of incidence $β_0$=−45°. When the initial angle of incidence $β_0$ increases from the state shown in FIG. 7B, the keystone distortion due to the angle of incidence β increases. As a result, the left-right ratio of the scanning trace 24A is HL<HR, and the invalid scanning area increases.

Figure 7D:
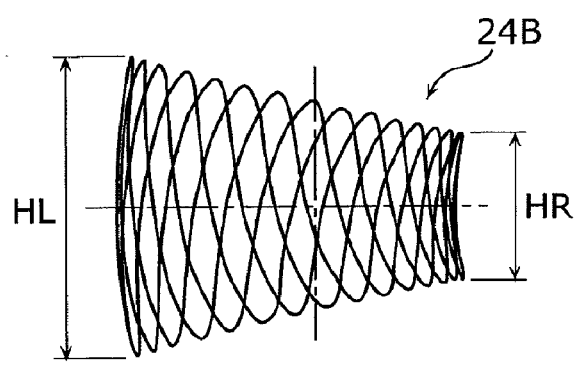
FIG. 7D is a diagram showing a scanning trace when the initial angles of incidence $\alpha_0=45°$, and $\beta_0=26°$.

FIG. 7D is a figure showing the scanning trace 24B when the initial angle of incidence $β_0$=26°. That is, it is the scanning pattern in the case where the initial angle of incidence $β_0$ is taken in the direction opposite to the same in FIG. 7B. Here, the left side is expanded from the state shown in FIG. 7A where the height on the left end is high from the beginning, and it satisfies HL>HR. The ratio is (HL/HR)>($HL_0$/$HR_0$), and the invalid scanning area further increases.

As described above, when setting the scanning surface 23 tilted with respect to the scanning center axis 16, appropriately setting the initial angle of incidence $α_0$ on the biaxial scanning mirror 12 and the initial angle of incidence $β_0$ on the scanning surface 23 allows suppressing the keystone distortion on the shape of the scanning trace 24. As a result, it is possible to achieve good image display with small invalid scanning area.

Generally, as shown in FIG. 1, when the scanning surface 13 is taken perpendicular to the scanning center axis 16, it is preferable to have an angle of incidence $α_0$ as small as possible, insofar as the incident beam and the scanning beam do not interfere. However, as shown in FIG. 3, when it is necessary to set the scanning surface 23 tilted with respect to the scanning center axis 16, the relationship between the initial angles of incidence $α_0$ and $β_0$ needs to be taken into consideration.

Embodiment 2

Figure 8A:
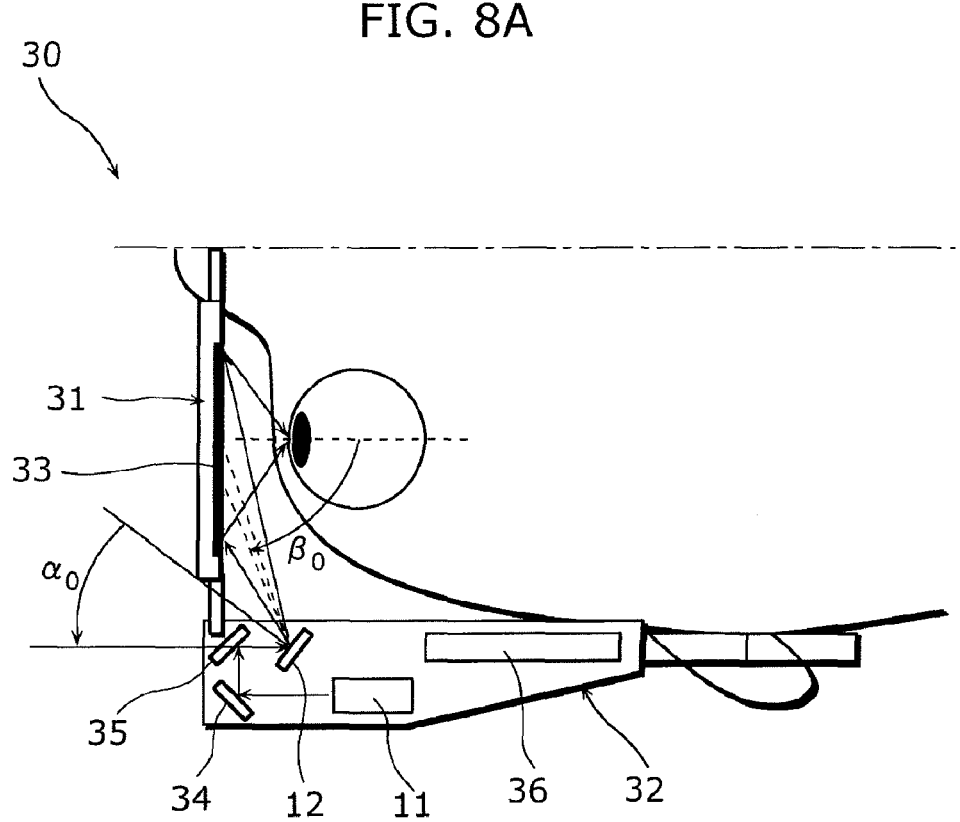
FIG. 8A is a plan view of the scanning image display apparatus according to the embodiment 2 of the present invention.
Figure 8B:
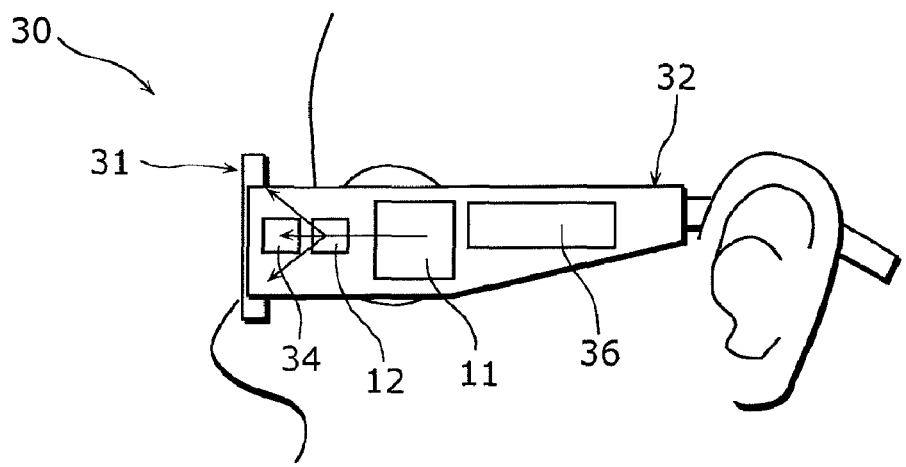
FIG. 8B is a side view of FIG. 8A.
Figure 9:
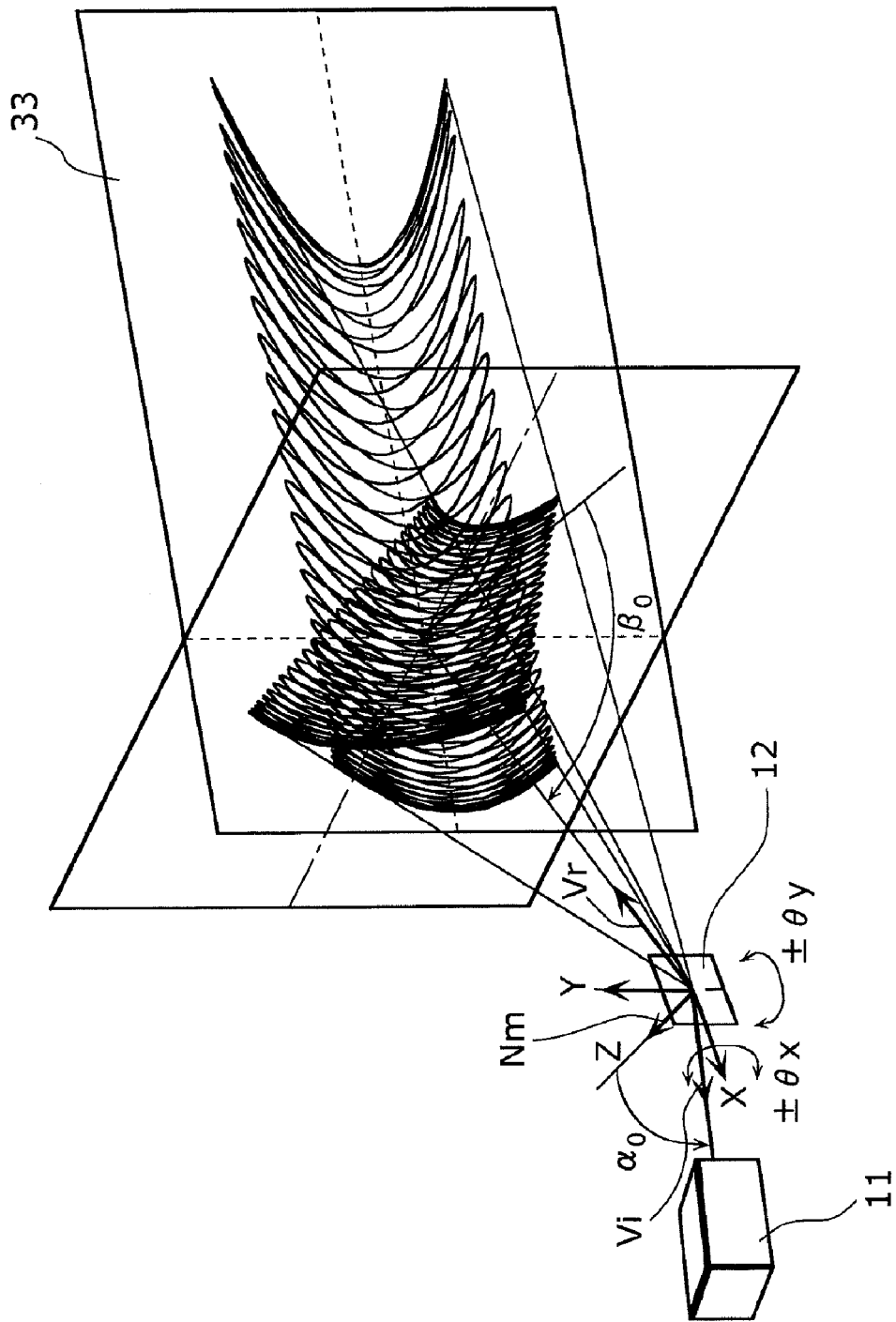
FIG. 9 is a model diagram showing a scanning image display apparatus according to the embodiment 2 of the present invention.

Next, the following is a description for the scanning image display apparatus with reference to FIGS. 8A, 8B, and 9 according to the embodiment 2 of the present invention. FIG. 8A is a plan view of the scanning image display apparatus. FIG. 8B is a side view of the scanning image display apparatus. FIG. 9 is a model diagram indicating a positional relationship of the components composing the scanning image display apparatus. Note that, although only the left half of the scanning image display apparatus is illustrated in FIGS. 8A and 8B, the right half of the scanning image display apparatus has the same structure. It should be also noted that the same reference numerals are attached to the components identical to the same in the embodiment 1, and the detailed description for these components is omitted.

The scanning image display apparatus according to the embodiment 2 is a goggle-shaped Head-Mounted Display (HMD) 30 worn on the head of the user. The goggle-shaped HMD 30 includes the lenses 31 arranged in front of the eyes of the user, and the temple 31 one end of which is connected to the outer rim of the lens 31, and the other end of which is fixed on the temporal part of the user.

The lens 31 has a holographic mirror 33 on the side facing the user's eye. The holographic mirror 33 corresponds to the scanning surface 23 in the embodiment 1, and functions as a deflection unit which deflects the scanned laser beam to the direction of the user's eye.

The temple 32 holds the light source 11 and the biaxial scanning mirror 12 with the same structure as in the embodiment 1, and further includes reflection mirrors (reflectors) 34, 35 which guide the laser beam emitted from the light source 11 to the biaxial scanning mirror 12 and a control unit 36 which controls each component of the goggle-shaped HMD 30.

In the goggle-shaped HMD 30 with the abovementioned structure, the laser beam emitted from the light source 11 is incident on the biaxial scanning mirror 12 through the reflection mirrors 34 and 35. The biaxial scanning mirror 12 scans the holographic mirror 33 two-dimensionally with the laser beam that is incident with the rotation of the biaxial scanning mirror 12 by the angular amplitudes θx and θy. The holographic mirror 33 deflects the laser beam scanned by the biaxial scanning mirror 12 in the direction to the user's eye. The laser beam enters the eye of the user, and forms an image on the retina.

The holographic mirror 33 is, for example, a photopolymer layer formed as the Lippmann volume hologram. Furthermore, giving wavelength selectivity allows reflecting only the wavelength of the laser beam emitted from the light source 11. As a result, the user can view both the outside scenery and the image rendered with the laser beam at the same time.

As shown in FIG. 8A, the light source 11 emits the laser beam from back to front, when seen by the user. On the other hand, the laser beam reflected from the reflection mirrors 34 and 35 that is incident on the biaxial scanning mirror 12 from back to front, when seen by the user. Furthermore, the laser beam scanned by the biaxial scanning mirror 12 is incident on the holographic mirror 33 from left back to the right front, when seen by the user.

Here, each component of the goggle-shaped HMD 30 is arranged such that the incident plane 15 of the goggle-shaped HMD 30 is horizontal from the user when the biaxial scanning mirror 12 is in the scanning center position. More specifically, FIG. 8A is a diagram showing the goggle-shaped HMD 30 seen from the direction perpendicular to the incident plane 15.

In FIG. 8A, the initial angle of incidence $\alpha_0$ on the biaxial scanning mirror 12 is set counterclockwise with respect to the normal line of the biaxial scanning mirror 12. Furthermore, the initial angle of incidence $\beta_0$ on the holographic mirror 33 is set clockwise with respect to the normal line of the holographic mirror 33.

Here, when the initial angle of incidence on the holographic mirror 33 is $\beta_0=54.5°$, and the horizontal angle of field of the laser beam seen from the eye of the user is 100°, and the vertical angle of field is 56° (that is, 16:9), the shape of the scanning trace changes depending on the size of the initial angle of incidence $\alpha_0$ on the biaxial scanning mirror 12, and the size of the rotation angle necessary for the biaxial scanning mirror 12 changes accordingly.

More specifically, the initial angle of incidence on the biaxial scanning mirror 12 is $\alpha_0=70°$, $\theta x=\pm 20°$, and $\theta y=\pm 7.2°$ that satisfy the condition in Equation 2.

FIGS. 10A to 10F show the change in the scanning trace when the initial angle of incidence $\alpha_0$ changes from the state described above.

Figure 10A:
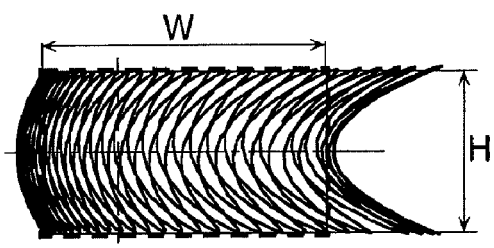
FIG. 10A is a diagram showing a scanning trace when the initial angles of incidence $\alpha_0=70°$, and $\beta_0=54.5°$.
Figure 10D:
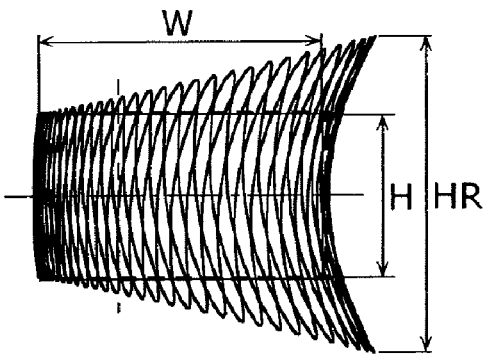
FIG. 10D is a diagram showing a scanning trace when the initial angles of incidence $\alpha_0=30°$, and $\beta_0=54.5°$.
Figure 10B:
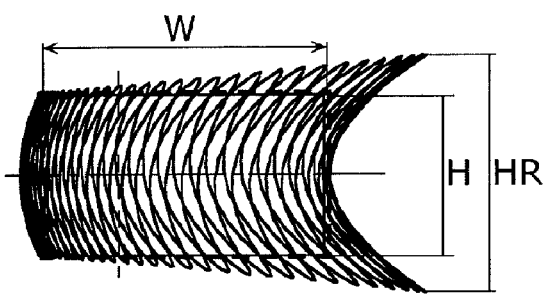
FIG. 10B is a diagram showing a scanning trace when the initial angles of incidence $\alpha_0=60°$, and $\beta_0=54.5°$.
Figure 10E:
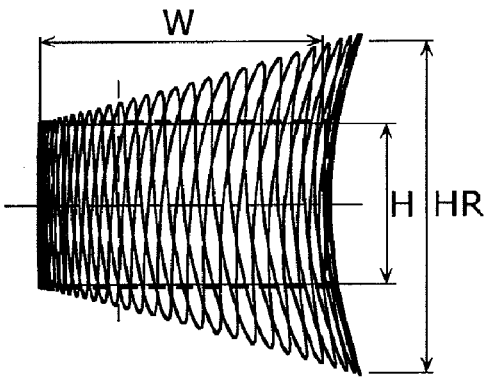
FIG. 10E is a diagram showing a scanning trace when the initial angles of incidence $\alpha_0=15°$, and $\beta_0=54.5°$.
Figure 10C:
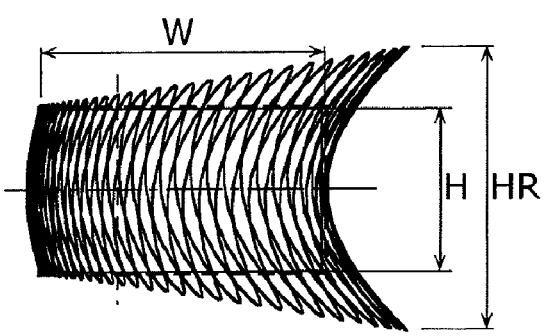
FIG. 10C is a diagram showing a scanning trace when the initial angles of incidence $\alpha_0=50°$, and $\beta_0=54.5°$.
Figure 10F:
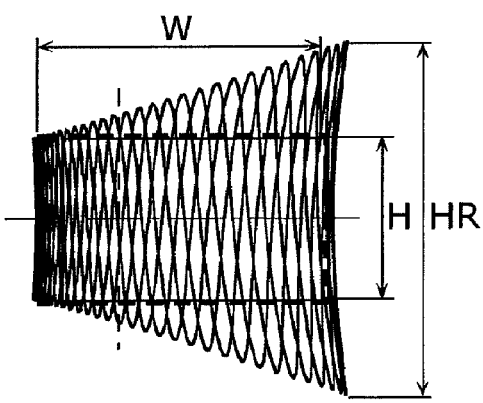
FIG. 10F is a diagram showing a scanning trace when the initial angles of incidence $\alpha_0=0°$, and $\beta_0=54.5°$.

FIG. 10A is a diagram showing the scanning trace when the initial angle of incidence $\alpha_0=70°$ which satisfies the condition described in Equation 2. Here, the top and the bottom of the scanning trace is parallel, and the invalid scanning area, which is an area sticking out of the image display area of the width W×the height H (shown in broken line) is minimized.

The following shows, in FIGS. 10B to 10F, the shape of the scanning trace when the initial angle of incidence $\alpha_0$ is decreased while securing the image display area having the width W×the height H. The smaller the initial angle of incidence $\alpha_0$ becomes, the larger and wider the height HR on the right side of the scanning trace becomes. It makes the top and bottom of the scanning trace non-parallel, and as a result, the invalid scanning area increases.

In this case, the initial angle of incidence is relatively large, that is, $\beta_0=54.5°$. Thus, the initial angle of incidence $\alpha_0$ on the biaxial scanning mirror 12 that satisfies Equation 2 becomes very large, that is, $\alpha_0=70°$. Furthermore, the necessary angular amplitude θx in the vertical direction of the biaxial scanning mirror 12 also becomes very large, that is, ±20°.

However, in the biaxial scanning mirror 12 that is small and shakes at high speed, it is difficult to achieve the angular amplitude θx=±20°. Thus, the change in the invalid scanning area when a value smaller than the above description (70°) is set as the initial angle of incidence $\alpha_0$ is assessed.

Figure 11:
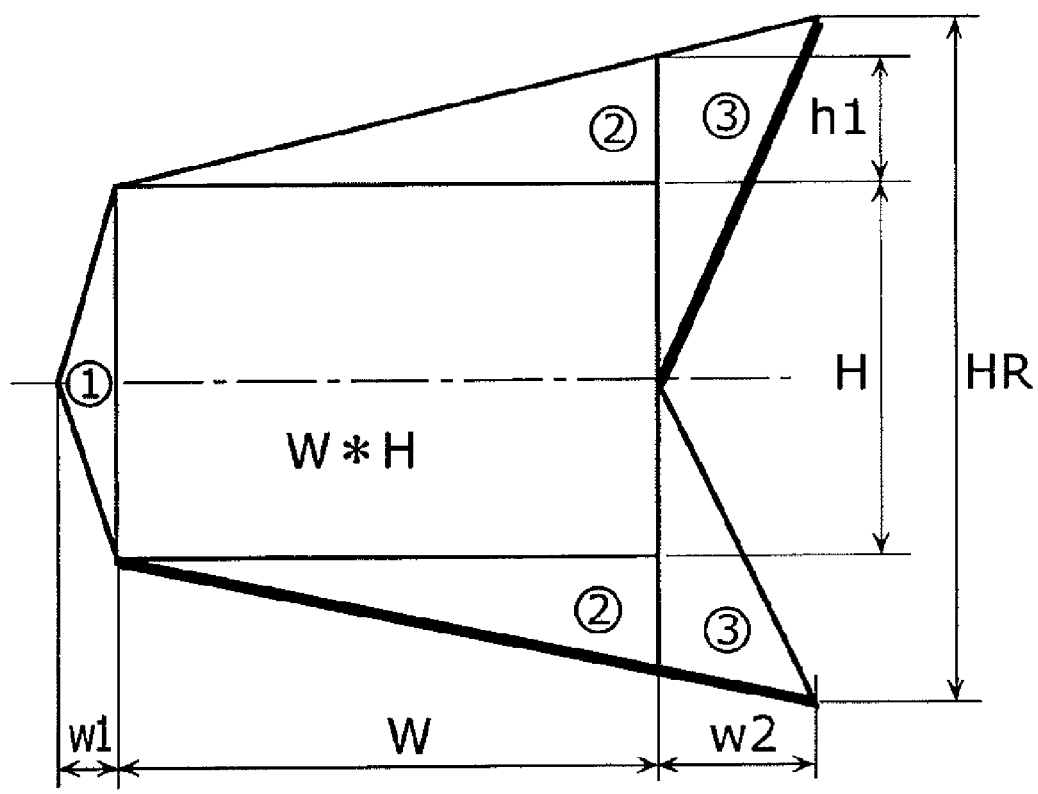
FIG. 11 is a schematic diagram of the scanning trace on the scanning surface.

FIG. 11 shows a schematic model diagram of the scanning trace on the holographic mirror 33.

The model diagram in FIG. 11 illustrates a simplified scanning trace generated by connecting the edges on the scanning trace. The size of the invalid scanning area with respect to the image display area which is W×H is assessed by measuring the area of each part in the model diagram.

Figure 12A:
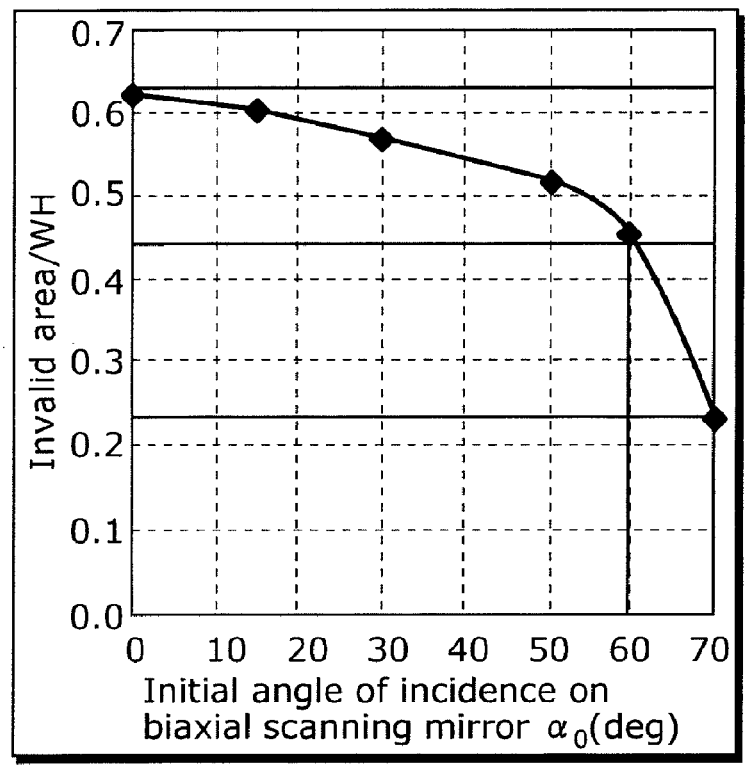
FIG. 12A is a diagram showing a relationship between the initial angle of incidence $\alpha_0$ on the biaxial scanning mirror and the invalid area.
Figure 12B:
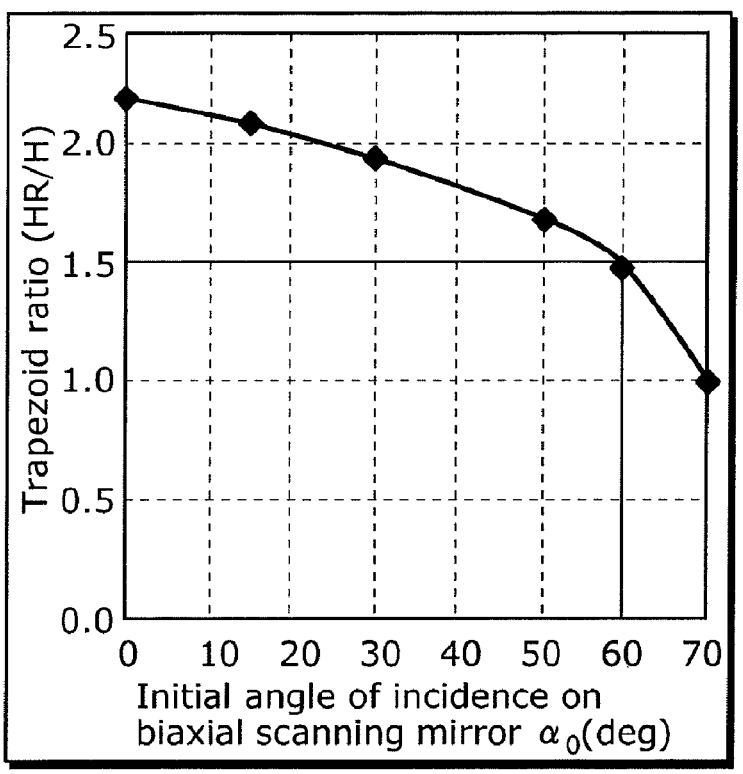
FIG. 12B is a diagram showing a relationship between the initial angle of incidence $\alpha_0$ on the biaxial scanning mirror and a trapezoid ratio.

FIGS. 12A and 12B show the assessment example according to the embodiment 2.

FIG. 12A is a diagram showing a result of calculation showing a relationship between the initial angle of incidence $\alpha_0$ on the biaxial scanning mirror 12 and the invalid area ratio, using the model diagram in FIG. 11. Note that, "invalid area ratio"="area of invalid scanning area"/"area of the image display area (W×H)". FIG. 12B shows the result of the calculation of the relationship between the initial angle of incidence $\alpha_0$ on the biaxial scanning mirror 12 and the trapezoid ratio on the scanning trace, using the model diagram in FIG. 11. More specifically, the trapezoid ratio (=HR/H) with respect to the initial angle of incidence $\alpha_0$ is plotted.

The invalid area ratio is maximized when the initial angle of incidence $\alpha_0=0°$ (approximately 0.63), and is minimized when the initial angle of incidence $\alpha_0=70°$ (approximately 0.23). Similarly, the trapezoid ratio is maximized when the initial angle of incidence $\alpha_0=0°$ (approximately 2.2), and is minimized when the initial angle of incidence $\alpha_0=70°$ (approximately 1.0). More specifically, the invalid area rate and the trapezoid ratio decrease as the initial angle of incidence $\alpha_0$ increases.

Furthermore, the invalid area ratio when the initial angle of incidence $\alpha_0=60°$ is approximately 4.3, which is decreased to half (intermediate between the maximum value and the minimum value of the invalid area rate), compared to the case where the initial angle of incidence $\alpha_0=0°$. Also, the trapezoid ratio here is 1.5.

Accordingly, setting the initial angle of incidence $\alpha_0$ on the biaxial scanning mirror 12 such that the trapezoid ratio is 1.5 with respect to the value of the initial angle of incidence $\beta_0$ on the holographic mirror 33 reduces the invalid scanning area into half.

Here, the left side of Equation 2 represents the trapezoid ratio with respect to the initial angle of incidence $\alpha_0$ on the biaxial scanning mirror 12, and the right side of Equation 2 represents the trapezoid ratio with respect to the initial angle of incidence $\beta_0$ on the holographic mirror 33. Accordingly, it is necessary to satisfy Equation 13 in order to keep the invalid area ratio to half of the maximum value.

[Math. 12]

$$1.5 \times \frac{\omega(\alpha_0 - \theta y)}{\omega(\alpha_0 + \theta y)} = \frac{1 + \tan 2\theta y \tan \beta_0}{1 - \tan 2\theta y \tan \beta_0} \quad \text{(Equation 13)}$$

More specifically, it is necessary to arrange each component such that the initial angles of incidence $\alpha_0$ and $\beta_0$ satisfy Equation 1, using Equation 2 and Equation 12 such that the invalid scanning area ratio is equal to or less than half of the maximum value.

[Math. 13]

$$\frac{\omega(\alpha_0 - \theta y)}{\omega(\alpha_0 + \theta y)} \leq \frac{1 + \tan 2\theta y \tan \beta_0}{1 - \tan 2\theta y \tan \beta_0} \leq 1.5 \times \frac{\omega(\alpha_0 - \theta y)}{\omega(\alpha_0 + \theta y)} \quad \text{(Equation 1)}$$

More specifically, satisfying the relationship in Equation 1 allows reducing the invalid area with respect to the image display area into half.

Embodiment 3

Figure 13A:
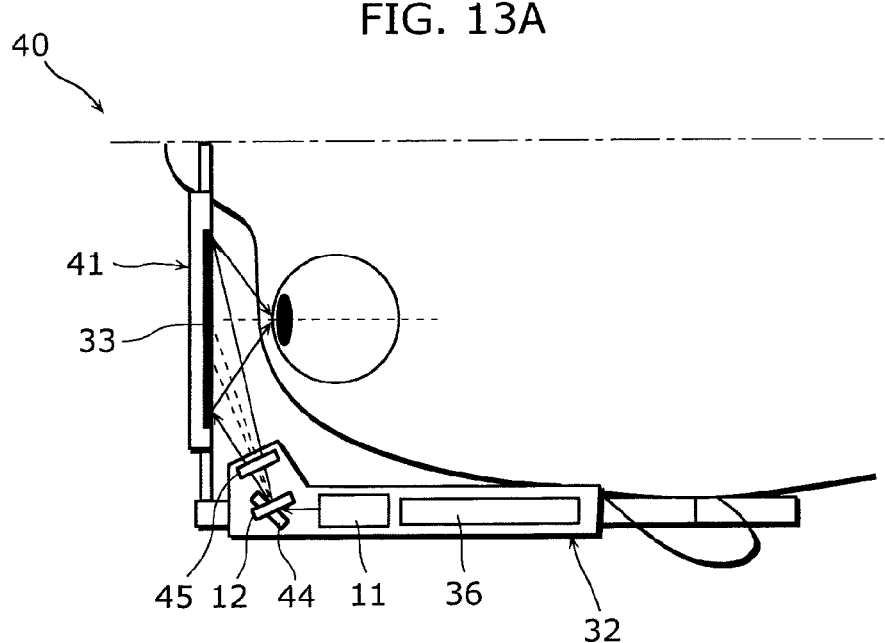
FIG. 13A is a plan view of the scanning image display apparatus according to the embodiment 3 of the present invention.
Figure 13B:
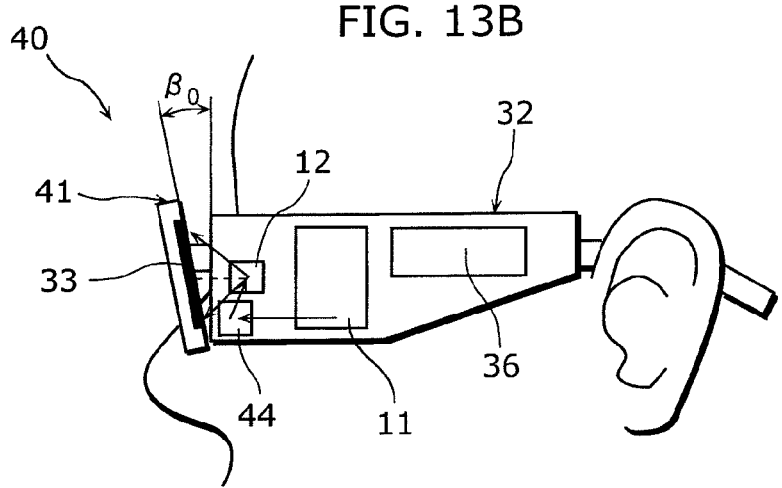
FIG. 13B is a side view of FIG. 13A.
Figure 13C:
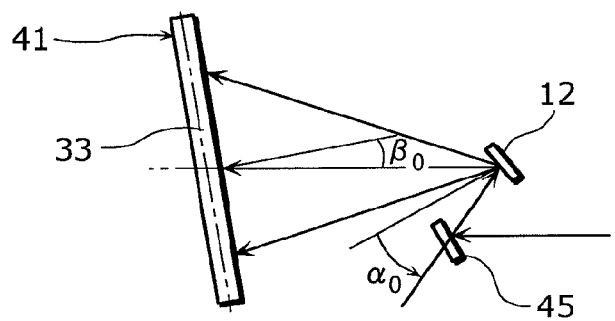
FIG. 13C is a diagram showing FIG. 13A from the user's side.
Figure 14:
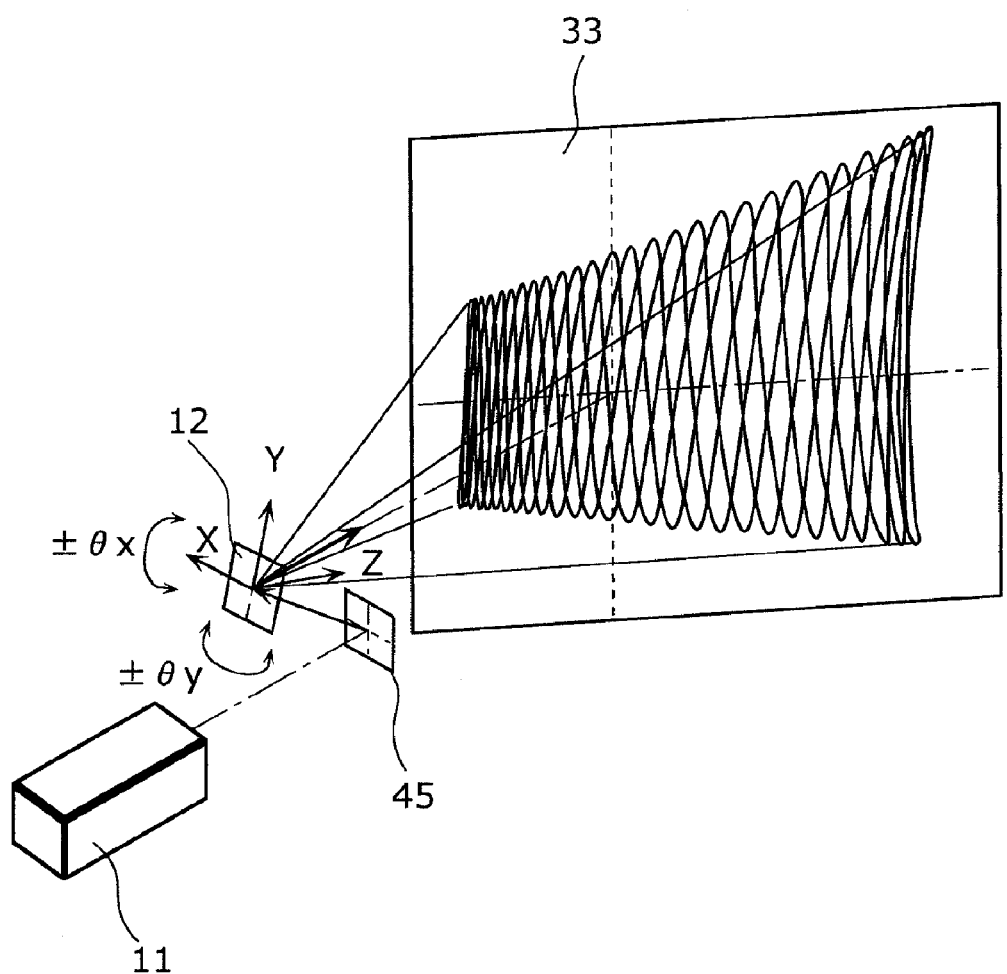
FIG. 14 is a model diagram showing a scanning image display apparatus according to the embodiment 3 of the present invention.

Next, the scanning image display apparatus according to the embodiment 3 of the present invention is described with reference to FIGS. 13A, 13B, 13C, and 14. FIG. 13A is a plan view of the scanning image display apparatus. FIG. 13B is a side view of the scanning image display apparatus. FIG. 13C is a cross-section diagram on the vertical side including the scanning center axis 16 in FIG. 13A. FIG. 14 is a model diagram showing the positional relationship of the components composing the scanning image display apparatus. Note that, although in FIGS. 13A to 14, only the left half of the scanning image display apparatus is illustrated, the right half of the scanning image display apparatus has the same structure. Furthermore, the same reference numerals are attached to the components identical to those in the embodiments 1 and 2, and the detailed description for these components is omitted.

The scanning image display apparatus according to the embodiment 3 is the goggle-shaped HMD 40. The goggle-shaped HMD 40 according to the embodiment 3 has a structure similar to the goggle-shaped HMD 30 according to the embodiment 2. However, the lens 41 is tilted forward by p (normally 10°), in the same manner as the conventional eyeglasses. In addition, in order to correspond to this, the reflection mirrors 44 and 45 are arranged below the biaxial scanning mirror 12, and the laser beam is incident on the biaxial scanning mirror 23 from below.

More specifically, the arrangement is made such that the upper end of the lens 31 moves forward, and the lower end moves backwards, compared to the goggle-shaped HMD 30. Furthermore, the inclination angle to the direction is $\beta_0$ with respect to the vertical surface. Furthermore, the reflection mirrors 44 and 45 causes the laser beam emitted from the light source 11 to be incident on the biaxial scanning mirror 12 on the vertical plane including the scanning center axis 16 and from below the scanning center axis 16.

This corresponds to arranging the incident plane 15 in the vertical direction with respect to FIG. 1. More specifically, as shown in FIG. 13C, when the goggle-shaped HMD 30 is seen from the horizontal direction (a direction perpendicular to the incident plane 15), the initial angle of incidence $\alpha_0$ on the biaxial mirror 12 is set counterclockwise with respect to the normal line of the biaxial scanning mirror 12. On the other hand, the initial angle of incidence $\beta_0$ on the holographic mirror 33 is set clockwise with respect to the normal line of the holographic mirror 33.

Here, when the initial angle of incidence on the holographic mirror 33 is $\beta_0=10°$, the initial angle of incidence on the biaxial scanning mirror 12 that satisfies Equation 2 is $\alpha_0=19.5°$. Accordingly, when the initial angles of incidence are $\alpha=19.5°$, and $\beta=10°$, the keystone distortion caused by tilting the lens 41 is resolved.

However, as shown in FIG. 13A, the holographic mirror 33 is tilted in the horizontal direction with respect to the scanning center 16 as well. In other words, the holographic mirror 33 is tilted such that the holographic mirror 33 intersects the incident plane 15 with an acute angle ($\neq 90°$). As a result, the right top of the scanning trace is farthest from the biaxial scanning mirror 12, and the scanning trace widens in the direction to the right top.

Figure 15A:
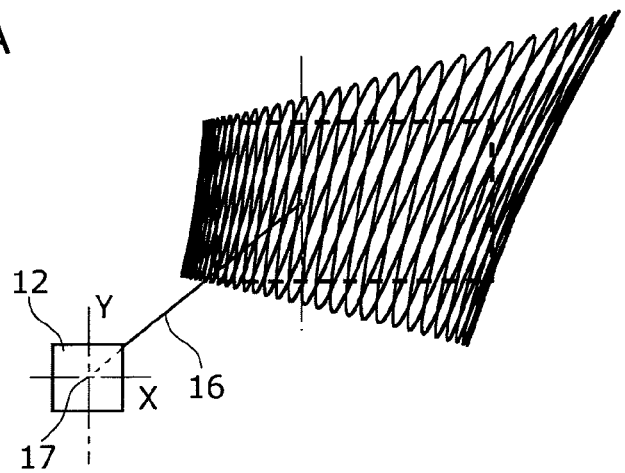
FIG. 15A is a diagram showing a scanning trace when the initial angles of incidence $\alpha_0=0°$, and $\beta_0=10°$.
Figure 15B:
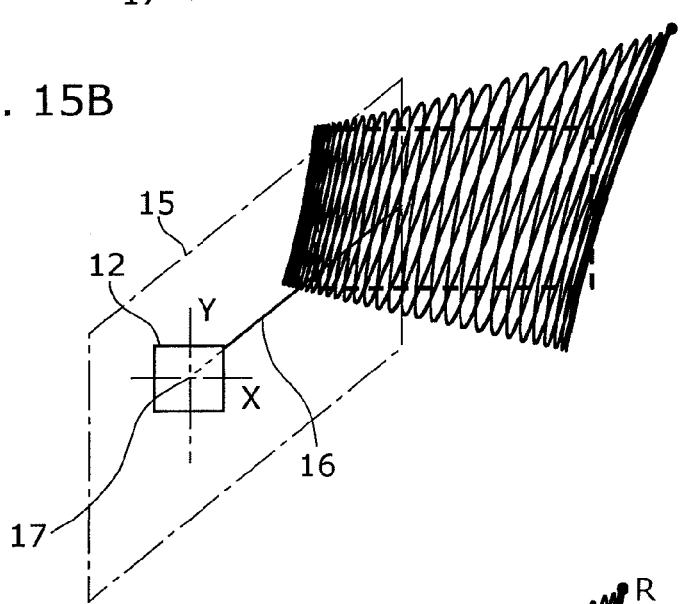
FIG. 15B is a diagram showing a scanning trace when the initial angles of incidence $\alpha_0=19.5°$, and $\beta_0=10°$.
Figure 15C:
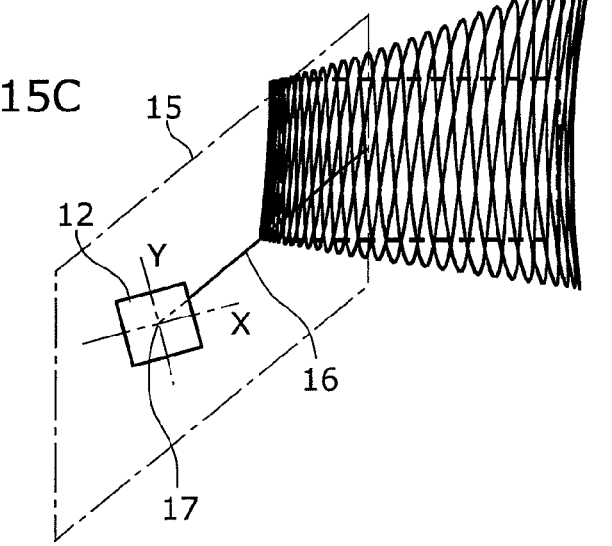
FIG. 15C shows the information, with the state of FIG. 15B as a reference, where the biaxial scanning mirror rotates counterclockwise.

FIGS. 15A, 15B, and 15C show the shape of the scanning trace on the holographic mirror 33 of the goggle-shaped HMD 40 with the structure described above.

FIG. 15A shows the scanning trace when the initial angle of incidence $\alpha_0=0°$. The scanning trace in this case widens to the above, since the holographic mirror 33 tilting forward. Furthermore, the scanning trace has a shape significantly widening to the right top, since the right side is far.

FIG. 15B shows the scanning trace when the initial angle of incidence $\alpha_0=19.5°$. As described above, setting the initial angles of incidence $\alpha_0$ and $\beta_0$ to satisfy Equation 2 reduces the widening to the top, allowing the sides on the left and right to be substantially parallel. However, due to the widening to the right top caused by the fact that the right side is far, the scanning line tilts to the side, which makes the rectangle of the image display area illustrated with the broken lines smaller.

Thus, as shown in FIG. 15C, having the state in FIG. 15B as a reference, when the biaxial scanning mirror 12 rotates the normal line of the biaxial scanning mirror 12 with the rotating axis (X axis and Y axis), the scanning trace rotates accordingly. As a result, side tilt on the scanning line can be removed. The direction of rotation of the biaxial scanning mirror 12 is a direction to move a point on the scanning trace farthest from the scanning center point 17 closer to the incident plane 15.

More specifically, in FIG. 15B, the point on the scanning trace farthest from the scanning center point 17 is the point R on the right top. Furthermore, the incident plane 15 is a vertical surface including the scanning center axis 16. More specifically, as shown in FIG. 15C, when the biaxial scanning mirror 12 is set after rotating counterclockwise by 7° from the state shown in FIG. 15B, the sides on the left and right of the scanning trace are substantially perpendicular, and the tilt of the scanning line is removed. Accordingly, it is possible to fully secure the image display area. Although the invalid scanning area remains above and below the image display area, the scanning line is nearly perpendicular and parallel, which allows the display to have good quality.

As described above, in the scanned-type image display apparatus using the biaxial scanning mirror 12, appropriately setting the initial angle of incidence $\alpha_0$ on the biaxial scanning mirror 12 and the initial angle of incidence $\beta_0$ on the holographic mirror 33 (scanning surface), and setting the angle around the normal line of the biaxial scanning mirror 12 allows setting the shape of scanning trace appropriately with respect to the image display area and the display in good quality.

Note that, although an example in this embodiment describes an example of the Lissajous pattern assuming the biaxial resonance mirror. However, the scanning trace itself is completely identical in the regular raster scan.

Embodiment 4

Figure 16:
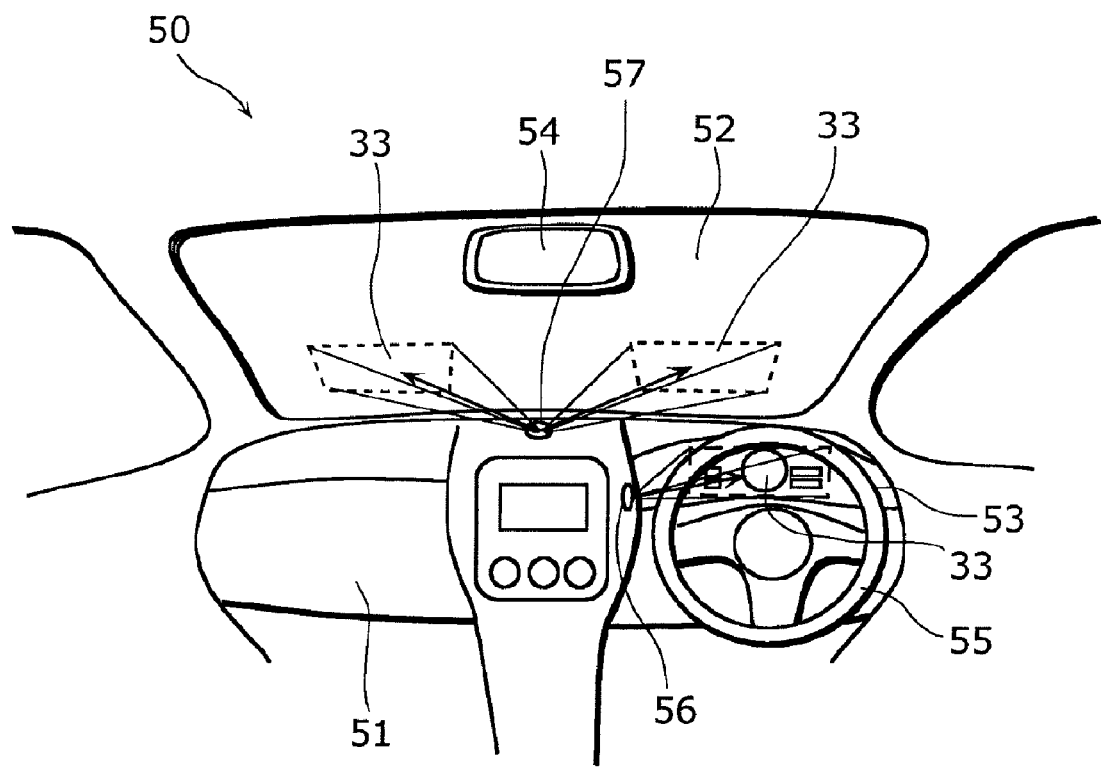
FIG. 16 is a diagram showing an example of an automobile on which the scanning image display apparatus of the present invention is incorporated.
Figure 17A:
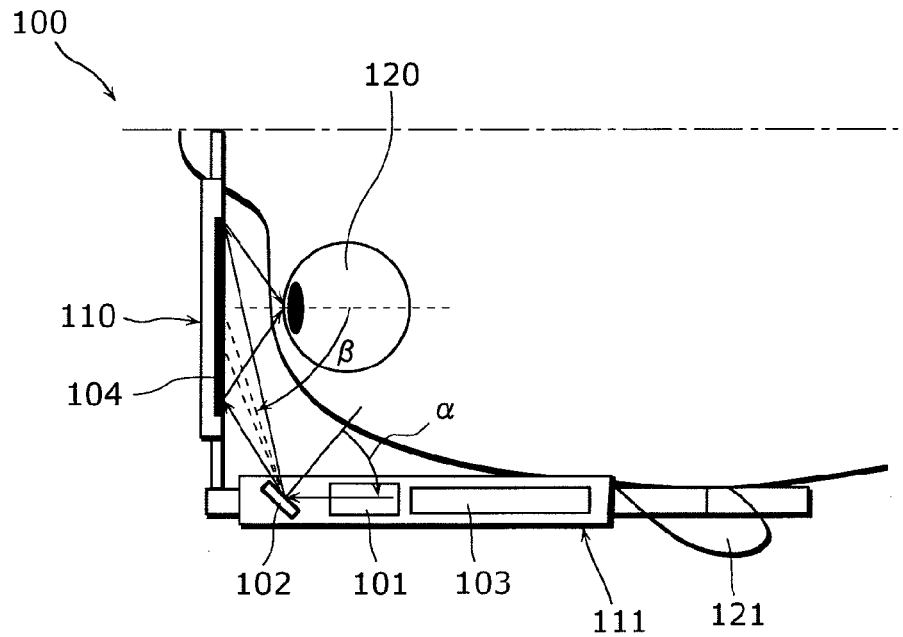
FIG. 17A is a plan view of the conventional scanning image display apparatus.
Figure 17B:
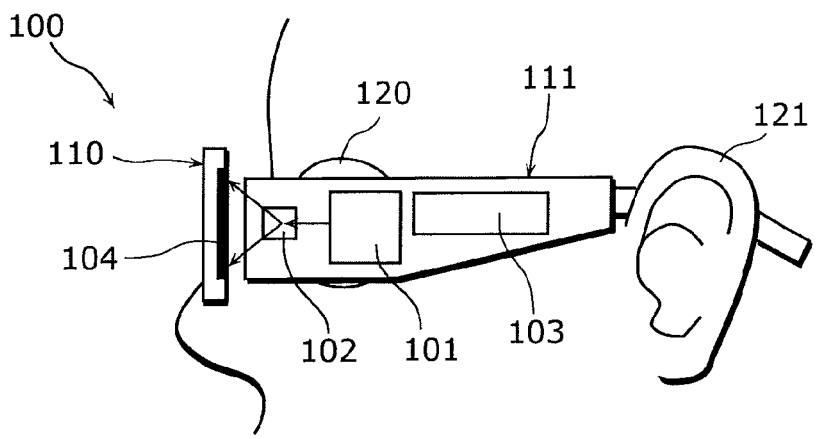
FIG. 17B is a side view of FIG. 17A.
Figure 17C:
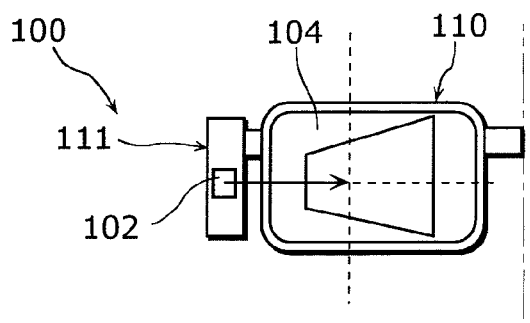
FIG. 17C is a diagram showing FIG. 17A from the user's side.

Next, the embodiment 4 where the scanning image display apparatus is applied to an on-vehicle apparatus is described with reference to FIG. 16. FIG. 16 is a diagram showing an automobile 50 on which the scanning image display apparatus according to the present invention is mounted. More specifically, FIG. 16 is a diagram illustrating a view in the automobile 50 facing the front. Note that, the same reference numerals are attached to the components identical to the embodiments 1 to 3, and the detailed description for these components is omitted.

The automobile 50 includes, as shown in FIG. 16, a seat (not shown), a dashboard 51 arranged in front of the seat, a windshield 52 arranged above the dashboard 51, an instrument panel 53 arranged on the surface facing the driving seat of the dashboard 51, a rearview mirror 54, and a steering 55.

In the automobile 50 with the abovementioned structure, the light source 11 and the biaxial scanning mirror 12 (not shown in FIG. 16), are held in the dashboard 51. Furthermore, the holographic mirrors 33 are attached to a position on the windshield 52 facing the seats (driving seat and passenger seat) and the instrument panel 53. Furthermore, the laser beam scanned using the biaxial scanning mirror 12 is projected on each holographic mirror 33 from the projection openings 56 and 57 which are set on the dashboard 51.

More specifically, the laser beam is projected onto the instrument panel 53 located behind the steering 55 from the projection opening 56 set at the center of the dashboard 51. Furthermore, the laser beam is projected from the projection opening 57 provided on the top of the dashboard 51 and to the windshield 52.

Note that, reflection screen and semi-transmissive diffusion screen may be applied on the windshield 52 and the instrument panel 53 instead of the holographic mirrors 33.

With this, the speedometer and the indicators are displayed on the instrument panel 53, and the speed display, night-vision image, and collision-warning towards pedestrians and obstacles are displayed.

As described above, according to the method of the present invention, the laser beam can be projected obliquely with respect to the scanning surface. This allows embedding the small scanning image display apparatus in a limited room in the driving seat, and displaying letters and symbols on various positions.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The scanning image display apparatus according to the present invention can appropriately set the shape of the scanning pattern, and is applicable to an image display apparatus such as a goggle-shaped HMD, and display systems.

| [Reference Signs List] | |
| --- | --- |
| 10, 20, 100 | Scanning image display apparatus |
| 11, 101 | Light source |
| 12, 102 | Biaxial scanning mirror |
| 13, 23 | Scanning surface |
| 14, 24, 24A, 24B | Scanning trace |
| 15 | Incident plane |
| 16 | Scanning center axis |
| 17 | Scanning center point |
| 30, 40 | Goggle-shaped HMD |
| 31, 41, 110 | Lens |
| 32, 111 | Temple |
| 33, 104 | Holographic mirror |
| 34, 35, 44, 45 | Reflection mirror |
| 36, 103 | Control unit |
| 50 | Automobile |
| 51 | Dashboard |
| 52 | Windshield |
| 53 | Instrument panel |
| 54 | Rearview mirror |
| 55 | Steering |
| 56, 57 | Projection opening |
| 120 | Eye |
| 121 | Ear |

The invention claimed is:

1. A scanning image display apparatus comprising:
   a light source which emits a laser beam; and
   a scanning unit configured to two-dimensionally scan a scanning surface with the laser beam by two-dimensionally rotating a reflection surface which reflects the laser beam emitted by said light source;
   wherein, when seen from a side which is perpendicular to an incident plane including a laser beam incident on said scanning unit and a laser beam scanned on said scanning surface by said scanning unit, with said scanning unit held at a rotation center position of said reflection surface,
   said light source and said scanning unit are arranged to have a positional relationship where the laser beam emitted by said light source is incident on said reflection surface, the laser beam being incident on said reflection surface obliquely at an initial angle of incidence $\alpha_0$ either clockwise or counterclockwise with respect to a first normal line of said reflection surface at an incident position of the laser beam, and
   said scanning unit and said scanning surface are arranged to have a positional relationship where the laser beam scanned by said scanning unit is incident on said scanning surface, the laser beam being incident on said scanning surface obliquely at an initial angle of incidence $\beta_0$ the other of clockwise or counterclockwise with respect to a second normal line of said scanning surface at an incident position of the laser beam;

wherein said scanning unit is configured to two-dimensionally scan said scanning surface with the laser beam emitted by said light source by rotating a first rotation axis which is perpendicular to the incident plane by an angular amplitude $\pm\theta y$ and by rotating a second rotation axis which is perpendicular to both the first normal line and the first rotation axis by an angular amplitude $\pm\theta x$, and a perpendicular scanning angle $\omega(\alpha)$ which is an angle that the laser beam scanned by said scanning unit rotating the second rotation axis by $+\theta x$ makes with the laser beam scanned by said scanning unit rotating the second rotation axis by $-\theta x$ satisfies Equation 1 as a function of an actual angle of incidence $\alpha$ $((\alpha_0-\theta y) \leq \alpha \leq (\alpha_0+\theta y))$ on said scanning unit $$\frac{\omega(\alpha_0 - \theta_y)}{\omega(\alpha_0 + \theta_y)} \leq \frac{1 + \tan 2\theta_y \tan \beta_0}{1 - \tan 2\theta_y \tan \beta_0} \leq 1.5 \times \frac{\omega(\alpha_0 - \theta_y)}{\omega(\alpha_0 + \theta_y)}. \quad \text{(Equation 1)}$$

2. The scanning image display apparatus according to claim 1,
wherein the perpendicular scanning angle $\omega(\alpha)$ further satisfies Equation 2

$$\frac{\omega(\alpha_0 - \theta_y)}{\omega(\alpha_0 + \theta_y)} = \frac{1 + \tan 2\theta_y \tan \beta_0}{1 - \tan 2\theta_y \tan \beta_0}. \quad \text{(Equation 2)}$$

3. The scanning image display apparatus according to claim 1,
wherein said scanning unit is arranged to have the first and second rotation axes being rotated at a predetermined angle in a predetermined rotation direction with respect to the first normal line, when said scanning surface is arranged to cross the incident plane at an acute angle.

4. The scanning image display apparatus according to claim 3,
wherein the rotation direction is a direction for moving, closer to the incident plane, a farthest entering position from said scanning unit among the entering positions of the laser beam scanned by said scanning unit on said scanning surface.

5. A goggle-shaped head mounted display comprising:
a lens arranged in front of an eye of a user;
a temple, an end of which is connected to said lens and the other end of which is fixed on a temporal part of a head of the user; and
the scanning image display apparatus according to claim 1,
wherein said light source and said scanning unit are held on said temple,
said scanning surface is arranged on a side of the lens facing the eye of the user and deflects the laser beam scanned by said scanning unit to a direction toward the eye of the user.

6. The goggle-shaped head mounted display according to claim 5,
wherein said temple further holds a reflector for changing a direction of the laser beam emitted by said light source to cause the laser beam to be incident on said scanning unit, and
said light source, the reflector, and said scanning unit are arranged to have a positional relationship such that a laser beam moving from said light source to the reflector moves from back to front when seen by the user, and a laser beam moving from the reflector to said scanning unit moves from front to back when seen by the user.

7. An automobile comprising:
a seat;
a dashboard arranged in front of said seat;
a windshield arranged above said dashboard; and
the scanning image display apparatus according to claim 1,
wherein said light source and said scanning unit are held in said dashboard, and
said scanning surface is arranged on said windshield in a position facing said seat, and deflects the laser beam scanned by said scanning unit to a direction toward the eye of the user sitting in said seat.

* * * * *